(12) United States Patent
Tsumiyama

(10) Patent No.: US 7,526,979 B2
(45) Date of Patent: May 5, 2009

(54) BICYCLE SHIFT POSITION CONTROL MECHANISM

(75) Inventor: Akira Tsumiyama, Osaka (JP)

(73) Assignee: Shimano Inc., Osaka (JP)

( * ) Notice: Subject to any disclaimer, the term of this patent is extended or adjusted under 35 U.S.C. 154(b) by 757 days.

(21) Appl. No.: 11/184,085

(22) Filed: Jul. 19, 2005

(65) Prior Publication Data

US 2007/0017316 A1 Jan. 25, 2007

(51) Int. Cl.
*F16C 1/10* (2006.01)
(52) U.S. Cl. .................................... 74/502.2
(58) Field of Classification Search ............. 74/473.13, 74/473.14, 473.15, 473.3, 500.5, 501.5 R, 74/501.6, 502.2
See application file for complete search history.

(56) References Cited

U.S. PATENT DOCUMENTS

| | | | |
|---|---|---|---|
| 3,418,867 A * | 12/1968 | Tetsuo | 74/535 |
| 4,222,286 A * | 9/1980 | Huret | 74/501.6 |
| 5,241,878 A | 9/1993 | Nagano | |
| 5,257,683 A | 11/1993 | Romano | |
| 5,400,675 A | 3/1995 | Nagano | |
| 5,676,022 A | 10/1997 | Ose | |
| 5,755,139 A | 5/1998 | Kojima | |
| 5,957,002 A * | 9/1999 | Ueng | 74/502.2 |
| 6,066,057 A | 5/2000 | Nakamura et al. | |
| 6,073,730 A | 6/2000 | Abe | |
| 6,216,078 B1 | 4/2001 | Jinbo et al. | |
| 6,502,477 B1 | 1/2003 | Assel | |
| 6,647,823 B2 | 11/2003 | Tsumiyama et al. | |
| 2004/0005947 A1 | 1/2004 | Shahana et al. | |
| 2005/0126329 A1 | 6/2005 | Blaschke | |

FOREIGN PATENT DOCUMENTS

| | | |
|---|---|---|
| EP | 0 609 549 A1 | 8/1994 |
| EP | 0 698 548 A1 | 2/1996 |

* cited by examiner

*Primary Examiner*—Vicky A Johnson
(74) *Attorney, Agent, or Firm*—Global IP Counselors, LLP

(57) ABSTRACT

A bicycle shift position control mechanism is configured to provide a bicycle shifting unit with multiple gear shifting in a single upshift operation or a single downshift operation. The shift position control mechanism that has a wire take up member, a positioning member, a first position maintaining member and a second position maintaining member. The positioning member rotates with the wire take up member between one of a plurality of predetermined shift positions. The first position maintaining member selectively moves between a first engagement position that holds the positioning member in one of the predetermined shift positions and a first disengagement position that releases the positioning member for rotational movement. The second position maintaining member selectively moes between a second engagement position that holds the positioning member in one of the predetermined shift positions and a second disengagement position that releases the positioning member for rotational movement.

17 Claims, 21 Drawing Sheets

BICYCLE SHIFT POSITION CONTROL MECHANISM

BACKGROUND OF THE INVENTION

1. Field of the Invention

This invention generally relates to a bicycle control device. More specifically, the present invention relates to a bicycle control device that performs shifting operations.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, control devices for shifting have been extensively redesigned in recent years.

Currently, there are many types of cable operated shifting devices currently being installed on bicycles. For example, some cable operated shifting devices have a pair of shift levers and a cable winding mechanism that rotates via a ratchet mechanism. With conventional cable operated shifting devices of this type, operation of one of the shift lever causes the cable winder to rotate via the ratchet mechanism in one direction by one gear at a time. As a result, the cable is wound around the cable winder, and a shift is made by the shift mechanism from one gear to the next gear. Operation of the other shift lever causes the ratchet mechanism to be released and the cable winder to rotate in the other direction by one gear at a time. As a result, the cable that was wound on the cable winder is played out, and a shift is made in the opposite direction by the shift mechanism.

More recently, some cable operated shifting devices have been developed that allow multiple gear shifts in a single operation of one of the shift levers. These prior shifting devices can be complicated and expensive to manufacture and assemble. Furthermore, these prior shifting devices are sometimes heavy and/or cumbersome.

In view of the above, it will be apparent to those skilled in the art from this disclosure that there exists a need for an improved bicycle control (shifting) device. This invention addresses this need in the art as well as other needs, which will become apparent to those skilled in the art from this disclosure.

SUMMARY OF THE INVENTION

One object of the present invention is to provide a bicycle control device for pulling and releasing a wire of a shift cable with the bicycle control device being simple to operate such that multiple gear shifts can be performed in a single gear shifting operation.

Another object of the present invention is to provide a bicycle control device for shifting a bicycle transmission that is relatively simple and inexpensive to manufacture and assemble.

The foregoing objects can basically be attained by providing a bicycle shift position control mechanism that has a wire take up member, a positioning member, a first position maintaining member and a second position maintaining member. The wire take up member is configured and arranged to rotate about a rotational axis. The positioning member is configured and arranged to rotate with the wire take up member between one of a plurality of predetermined shift positions. The first position maintaining member is configured and arranged to selectively move between a first engagement position that holds the positioning member in one of the predetermined shift positions and a first disengagement position that releases the positioning member for rotational movement. The second position maintaining member is configured and arranged to selectively move between a second engagement position that holds the positioning member in one of the predetermined shift positions and a second disengagement position that releases the positioning member for rotational movement.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
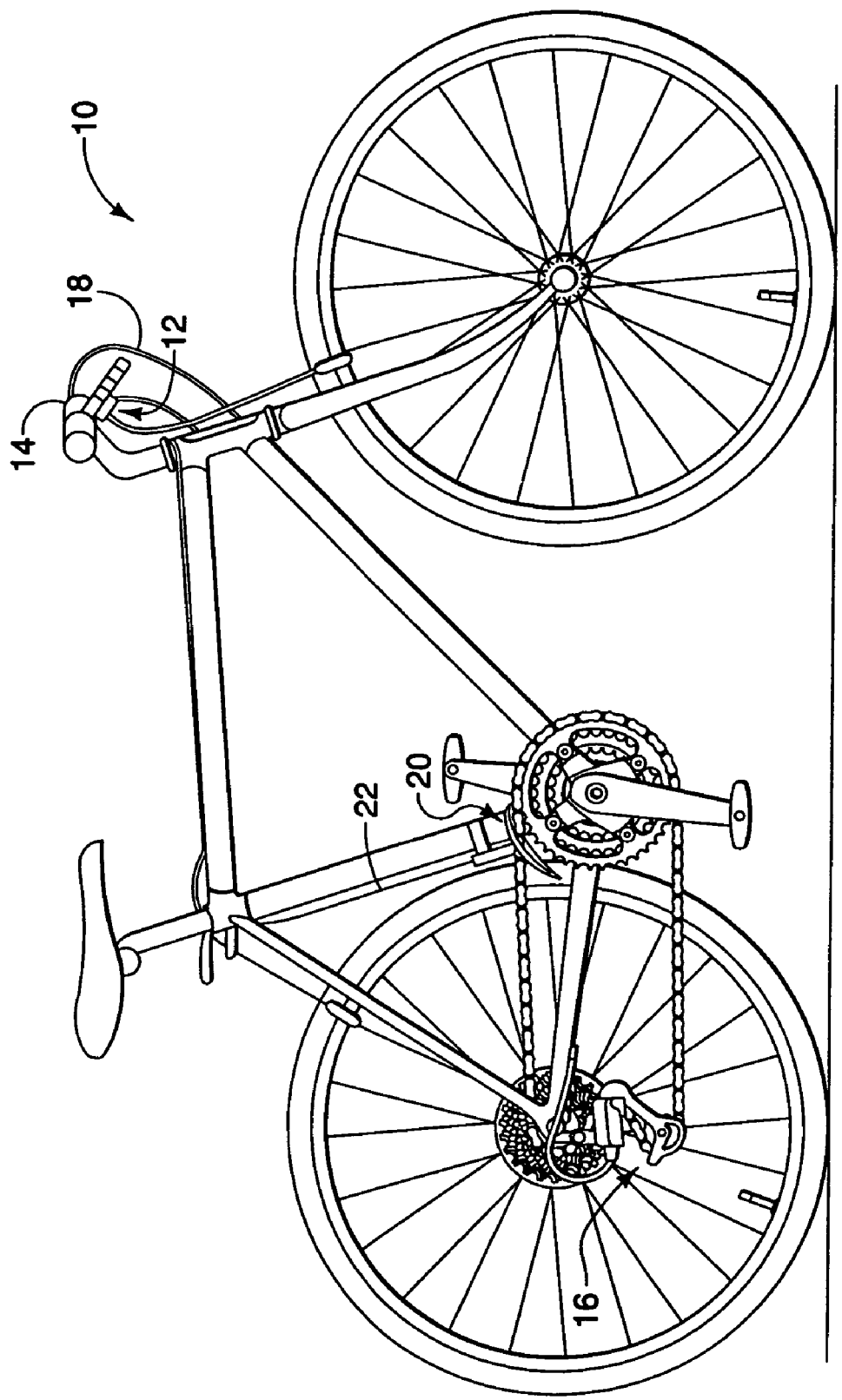
FIG. 1 is a side elevational view of a bicycle equipped with a pair of control devices (only one shown) in accordance with a first embodiment of the present invention.

Referring initially to FIG. 1, a bicycle 10 is illustrated with a bicycle control device 12 mounted on a bicycle handlebar 14 in accordance with one embodiment of the present invention. The bicycle control device 12 is a right hand side control device 12 operated by the rider's right hand. The bicycle control device 12 is preferably operatively coupled to a rear derailleur 16 via a shift control cable 18.

Preferably, the bicycle 10 includes a left hand side bicycle control device (not shown) that is substantially identical to the bicycle control device 12, except for the shifting unit has been modified to reduce the number of gears that can be shifted. Preferably, the left hand side bicycle control device is operatively coupled to a front derailleur 20 via a shift control cable 22. Alternatively, the control devices can be switched so that the rider can operate the rear derailleur 16 and the front derailleur 20 with opposite hands. In any event, the left hand side bicycle control device is essentially identical in construction and operation to the control device 12, except that it is a mirror image of the control device 12 and the number of shift positions for the left hand side bicycle control device is different. Thus, only the control device 12 will be discussed and illustrated herein. Preferably, the cables 18 and 22 are conventional bicycle cables that have an outer casing the covers an inner wire. For example, the shift control cable 18 has an inner wire 18a and an outer casing 18b.

Since most of the parts of the bicycle 10 are well known in the art, the parts of the bicycle 10 will not be discussed or illustrated in detail herein, except for the parts that relate to the present invention. In other words, only the parts related to the bicycle control device 12 will be discussed and illustrated in detail herein. Moreover, various conventional bicycle parts such as brakes, additional sprockets, derailleurs, etc., which are not illustrated and/or discussed in detail herein, can be used in conjunction with the present invention. Moreover, as used herein to describe the bicycle control device 12, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the bicycle control device 12 of the present invention.

Referring now to FIGS. 2-6, the bicycle control device 12 is illustrated in the rest position. The bicycle control device 12 basically includes a bicycle handlebar mounting portion 31, a braking unit 32 and a shifting unit 33. In this embodiment, the braking unit 32 and the shifting unit 33 are integrated into the mounting portion 31.

Figure 2:
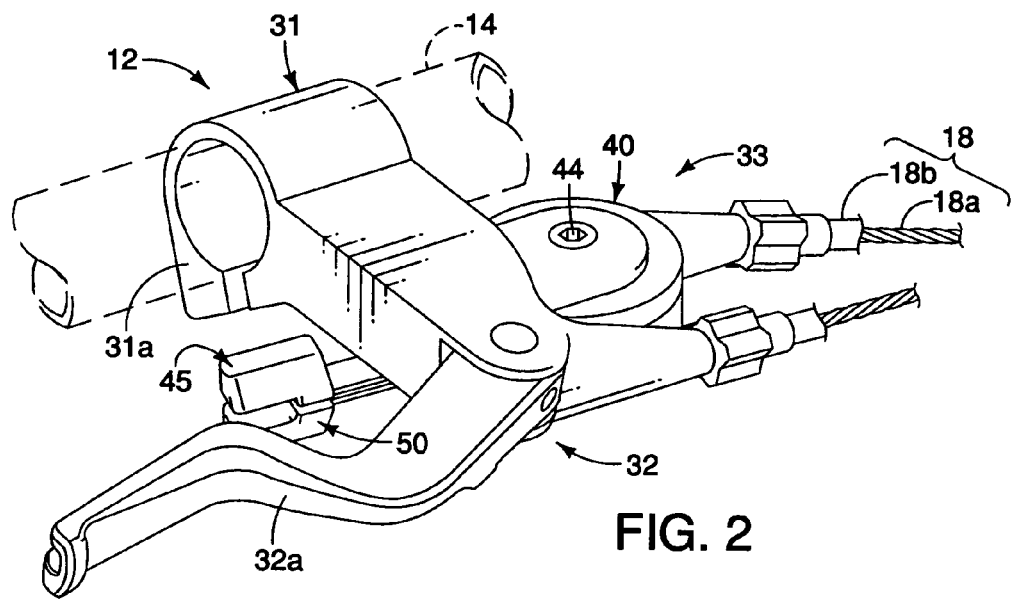
FIG. 2 is an enlarged perspective view of the bicycle control device illustrated in FIG. 1 in accordance with the first embodiment of the present invention.
Figure 3:
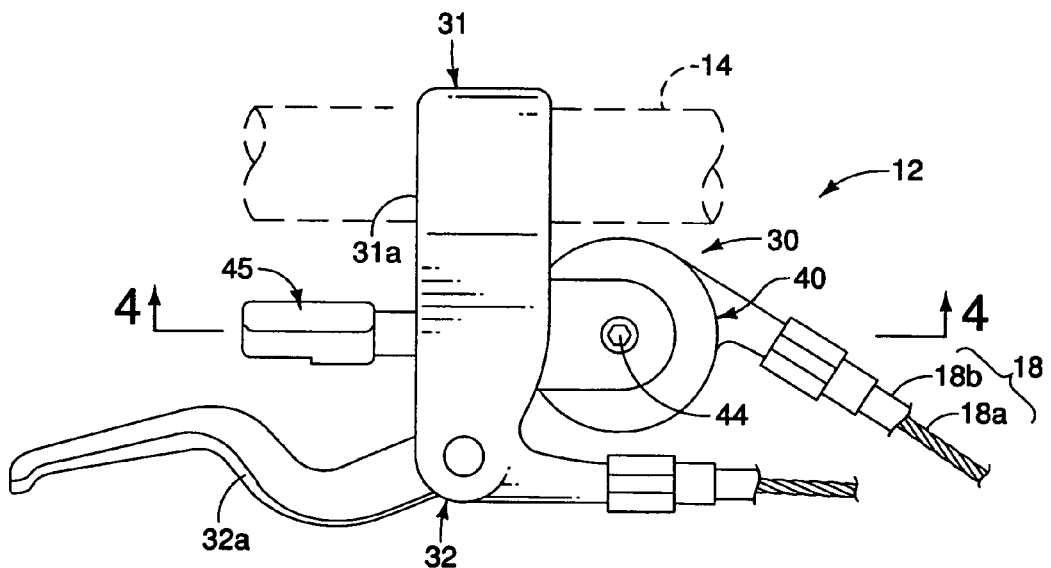
FIG. 3 is a top plan view of the bicycle control device illustrated in FIGS. 1 and 2, with the operating members (shift levers) in the rest position.
Figure 4:
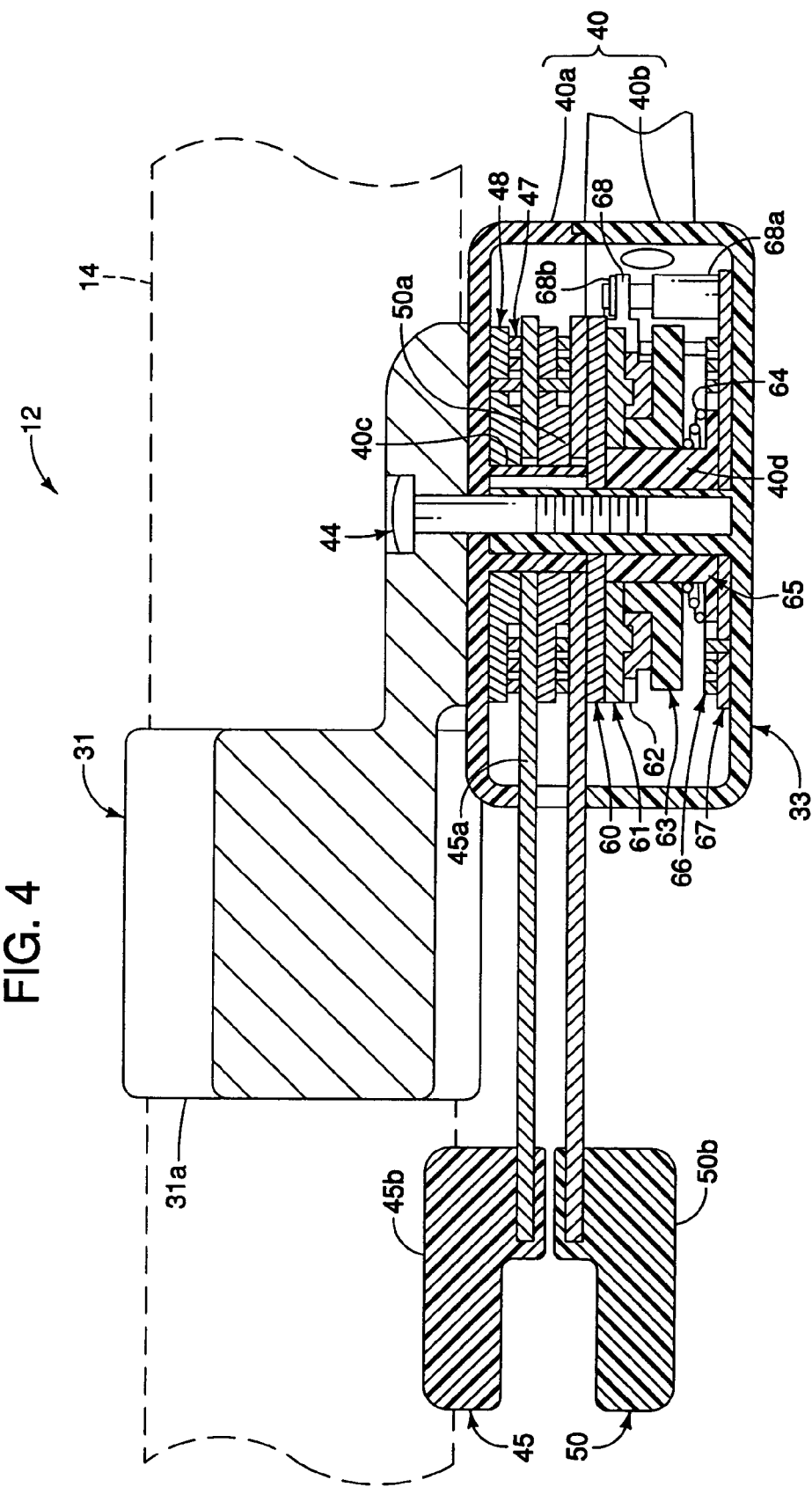
FIG. 4 is a partial cross sectional view of the bicycle control device as viewed along section line 4-4 of FIG. 3.

As best seen FIG. 2, the handlebar mounting portion 31 has a clamping section 31a that is preferably a split bore type of clamping arrangement in which the diameter of the bore is varied by a fixing bolt in a conventional manner. The clamping section 31a is relatively conventional in construction, and thus, will not be discussed or illustrated in further detail herein.

The braking unit 32 has a brake lever 32a that is pivotally mounted to the bicycle handlebar mounting portion 31 to pull and release an inner wire of a brake cable in a conventional manner. The configuration of the braking unit 32 can be any configuration, and thus, will not be discussed in further detail herein. In fact, the braking unit 32 can be eliminated from the bicycle control device 12 as needed and/or desired.

The shifting unit 33 basically includes a housing 40, a shift wire releasing assembly 41, a shift wire winding assembly 42 and a bicycle shift position control mechanism 43. The shifting unit 33 is configured and arranged such that the inner wire 18a of the shift control cable 18 can be pulled and released to selectively effect either a single-stage gear shift operation or a multiple-stage gear shift operation in a single progress shifting operation as explained below.

Figure 5:
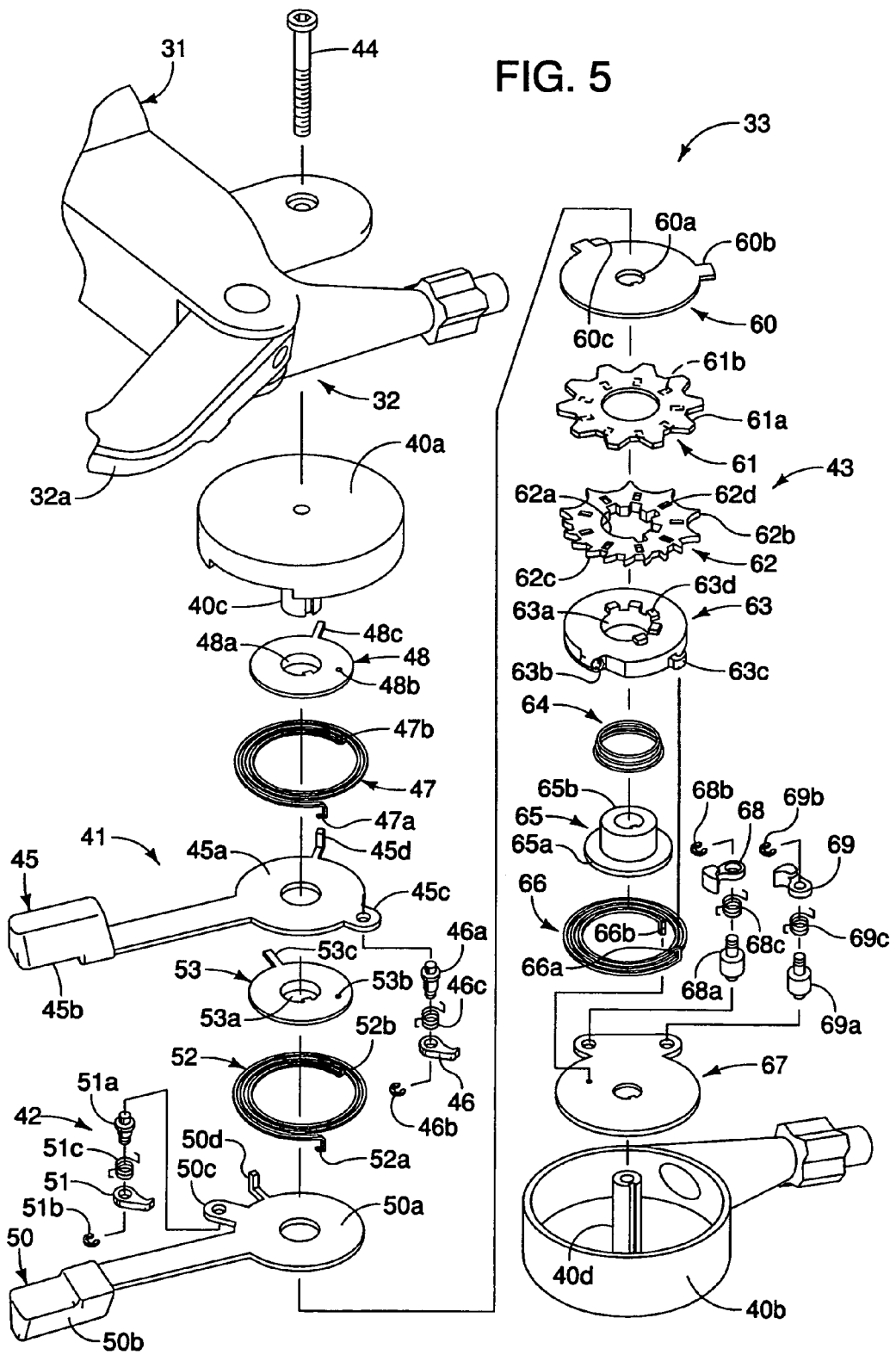
FIG. 5 is an exploded perspective view of the bicycle control device illustrated in FIGS. 1-4 in accordance with the first embodiment of the present invention.
Figure 6:
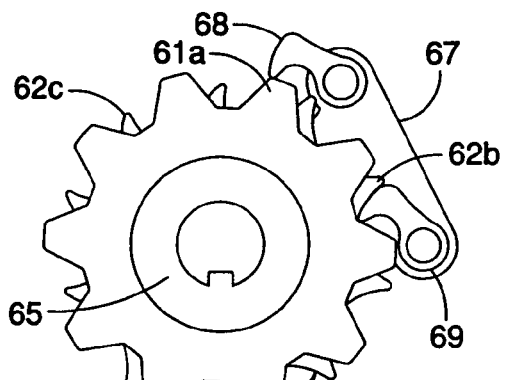
FIG. 6 is a simplified top plan view of selected parts of the shift position control mechanism for the bicycle control device illustrated in FIGS. 1-5, with the positioning plate and the releasing plate in their normal rest positions when the bicycle control device is in the first gear position, i.e., the inner wire of the rear shift cable being fully released from the wire takeup member.
Figure 7:
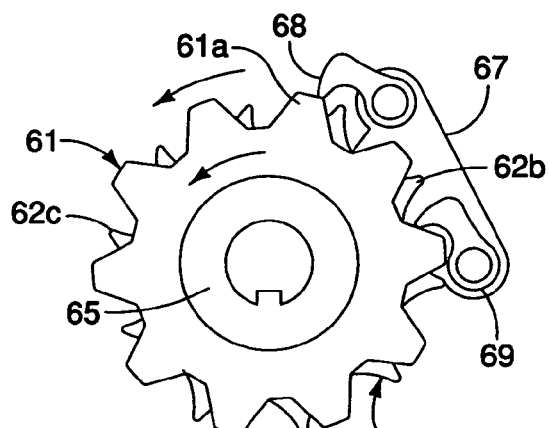
FIG. 7 is a simplified rear side elevational view of the shift position control mechanism for the bicycle control device illustrated in FIGS. 1-5, with the positioning plate and the releasing plate being rotated together by the winding lever in the shift winding direction such that the releasing plate moves the first and second position maintaining members or pawls out of engagement with the positioning plate and the releasing plate for performing a shift from the first gear position to the second gear position.
Figure 8:
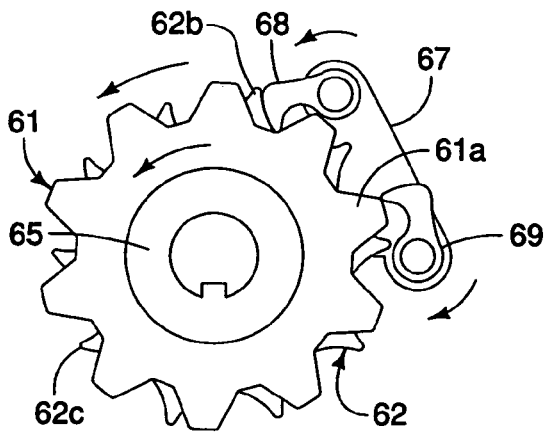
FIG. 8 is a simplified top plan view of selected parts of the shift position control mechanism for the bicycle control device illustrated in FIGS. 1-5, with the positioning plate and the releasing plate in their normal rest positions when the bicycle control device is in the second gear position.
Figure 9:
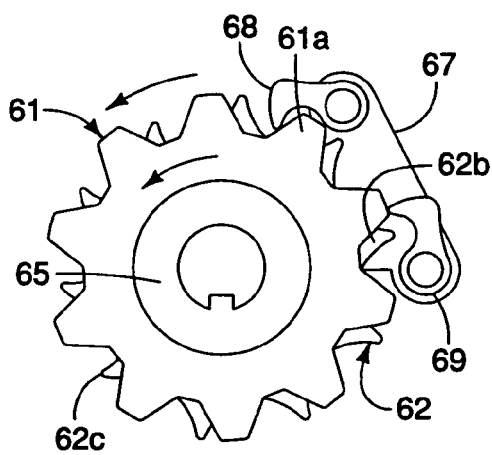
FIG. 9 is a simplified rear side elevational view of the shift position control mechanism for the bicycle control device illustrated in FIGS. 1-5, with the positioning plate and the releasing plate being rotated together by the winding lever in the shift winding direction such that the releasing plate moves the first and second position maintaining pawls out of engagement with the positioning plate and the releasing plate for performing a shift from the second gear position to the third gear position.
Figure 10:
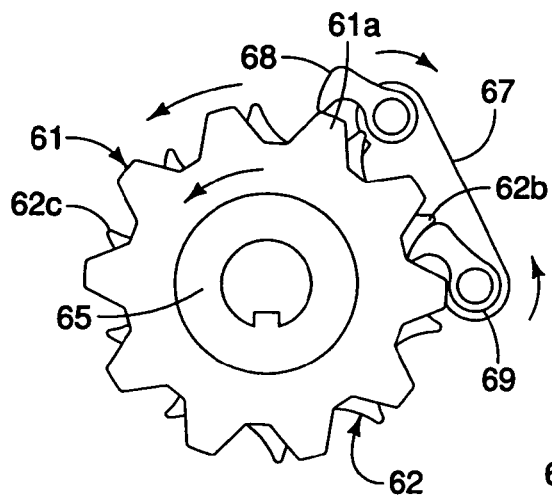
FIG. 10 is a simplified top plan view of selected parts of the shift position control mechanism for the bicycle control device illustrated in FIGS. 1-5, with the positioning plate and the releasing plate in their normal rest positions when the bicycle control device is in the third gear position.
Figure 11:
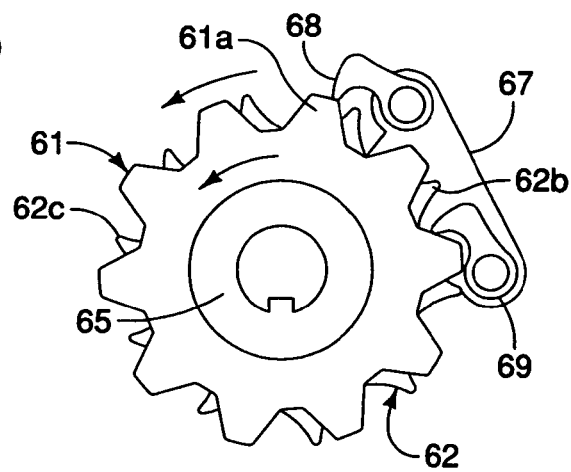
FIG. 11 is a simplified rear side elevational view of the shift position control mechanism for the bicycle control device illustrated in FIGS. 1-5, with the positioning plate and the releasing plate being rotated together by the winding lever in the shift winding direction such that the releasing plate moves the first and second position maintaining pawls out of engagement with the positioning plate and the releasing plate for performing a shift from the third gear position to the fourth gear position.
Figure 12:
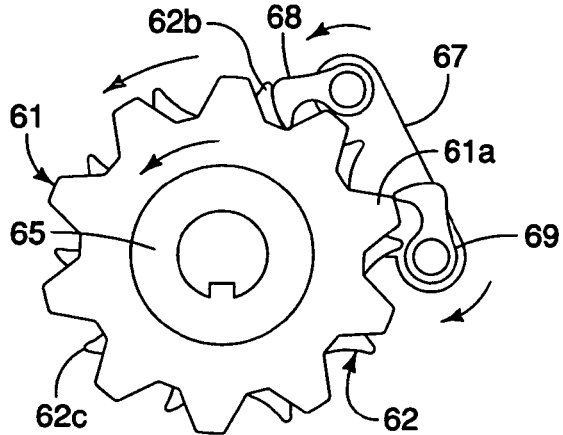
FIG. 12 is a simplified top plan view of selected parts of the shift position control mechanism for the bicycle control device illustrated in FIGS. 1-5, with the positioning plate and the releasing plate in their normal rest positions when the bicycle control device is in the fourth gear position.
Figure 13:
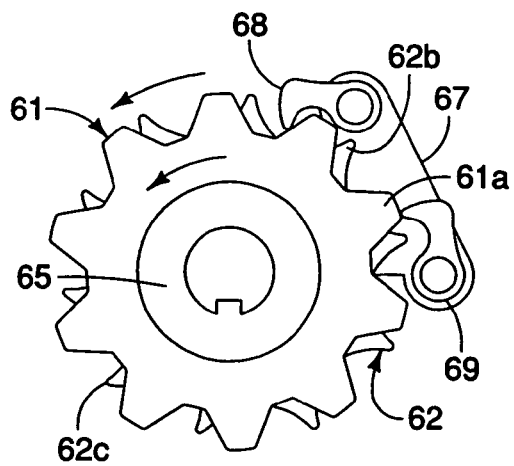
FIG. 13 is a simplified rear side elevational view of the shift position control mechanism for the bicycle control device illustrated in FIGS. 1-5, with the positioning plate and the releasing plate being rotated together by the winding lever in the shift winding direction such that the releasing plate moves the first and second position maintaining pawls out of engagement with the positioning plate and the releasing plate for performing a shift from the fourth gear position to the fifth gear position.
Figure 14:
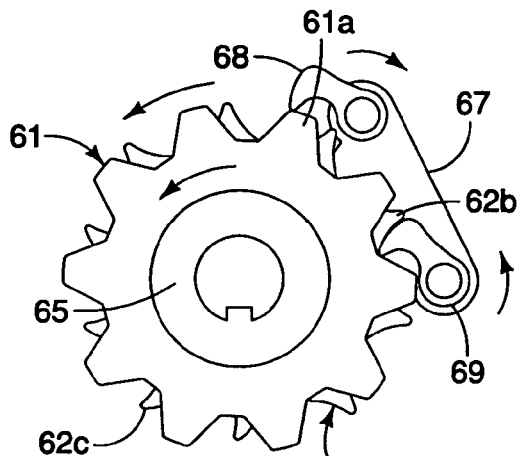
FIG. 14 is a simplified top plan view of selected parts of the shift position control mechanism for the bicycle control device illustrated in FIGS. 1-5, with the positioning plate and the releasing plate in their normal rest positions when the bicycle control device is in the fifth gear position.
Figure 15:
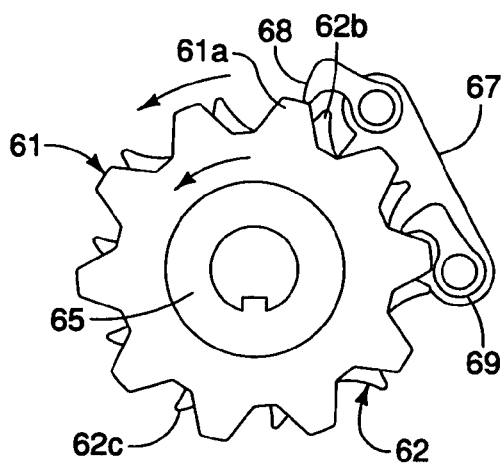
FIG. 15 is a simplified rear side elevational view of the shift position control mechanism for the bicycle control device illustrated in FIGS. 1-5, with the positioning plate and the releasing plate being rotated together by the winding lever in the shift winding direction such that the releasing plate moves the first and second position maintaining pawls out of engagement with the positioning plate and the releasing plate for performing a shift from the fifth gear position to the sixth gear position.
Figure 16:
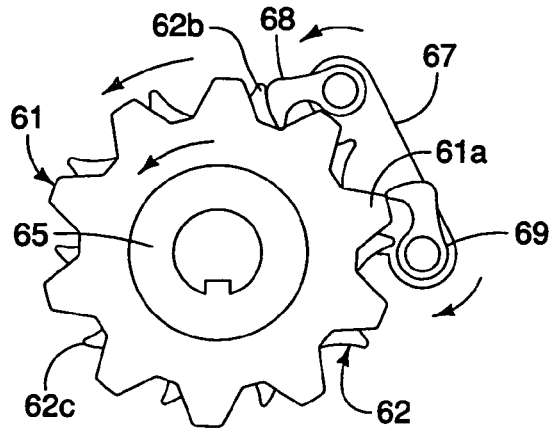
FIG. 16 is a simplified top plan view of selected parts of the shift position control mechanism for the bicycle control device illustrated in FIGS. 1-5, with the positioning plate and the releasing plate in their normal rest positions when the bicycle control device is in the sixth gear position.
Figure 17:
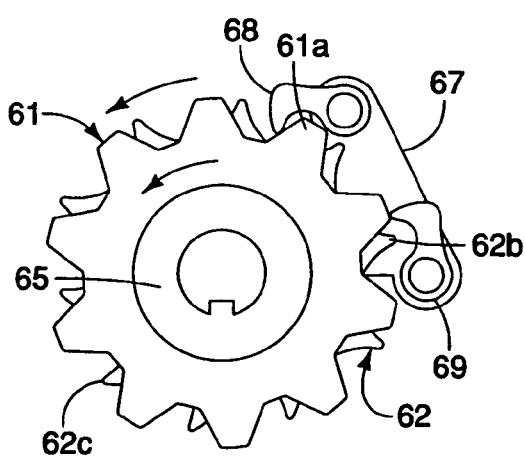
FIG. 17 is a simplified rear side elevational view of the shift position control mechanism for the bicycle control device illustrated in FIGS. 1-5, with the positioning plate and the releasing plate being rotated together by the winding lever in the shift winding direction such that the releasing plate moves the first and second position maintaining pawls out of engagement with the positioning plate and the releasing plate for performing a shift from the sixth gear position to the seventh gear position.
Figure 18:
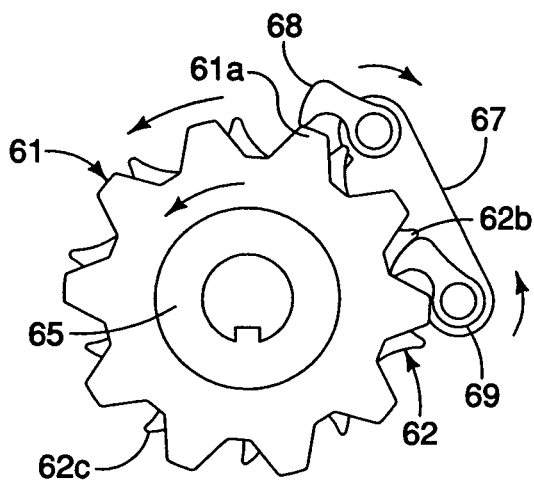
FIG. 18 is a simplified top plan view of selected parts of the shift position control mechanism for the bicycle control device illustrated in FIGS. 1-5, with the positioning plate and the releasing plate in their normal rest positions when the bicycle control device is in the seventh gear position.
Figure 19:
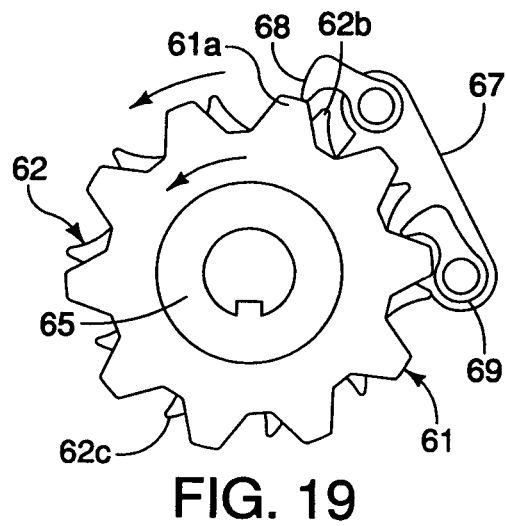
FIG. 19 is a simplified rear side elevational view of the shift position control mechanism for the bicycle control device illustrated in FIGS. 1-5, with the positioning plate and the releasing plate being rotated together by the winding lever in the shift winding direction such that the releasing plate moves the first and second position maintaining pawls out of engagement with the positioning plate and the releasing plate for performing a shift from the seventh gear position to the eighth gear position.
Figure 20:
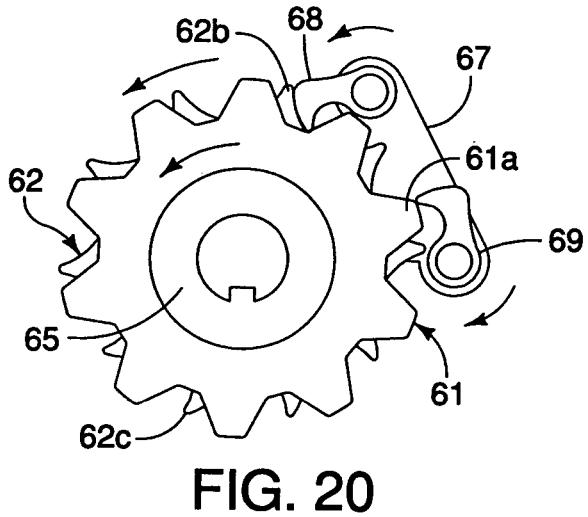
FIG. 20 is a simplified top plan view of selected parts of the shift position control mechanism for the bicycle control device illustrated in FIGS. 1-5, with the positioning plate and the releasing plate in their normal rest positions when the bicycle control device is in the eighth gear position.
Figure 21:
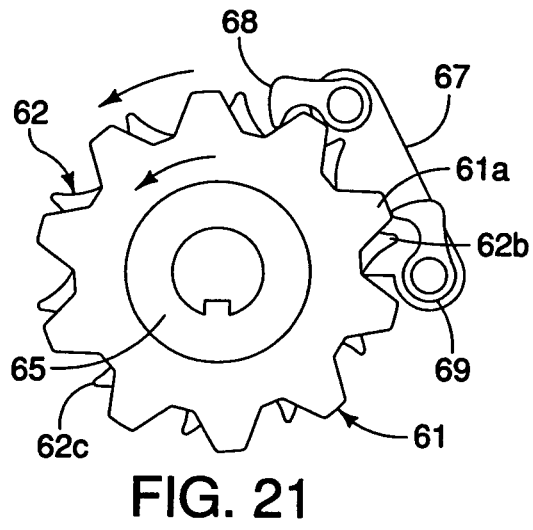
FIG. 21 is a simplified rear side elevational view of the shift position control mechanism for the bicycle control device illustrated in FIGS. 1-5, with the positioning plate and the releasing plate being rotated together by the winding lever in the shift winding direction such that the releasing plate moves the first and second position maintaining pawls out of engagement with the positioning plate and the releasing plate for performing a shift from the eighth gear position to the ninth gear position.
Figure 22:
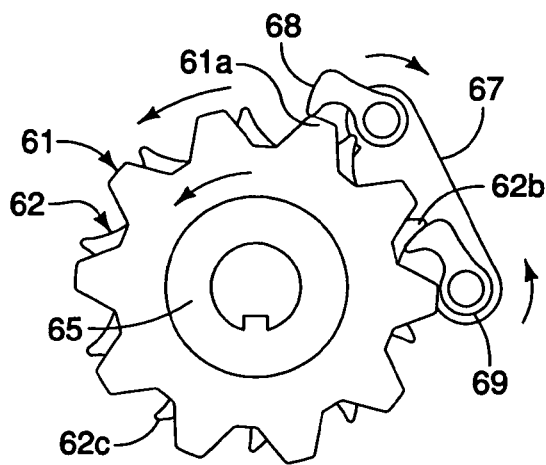
FIG. 22 is a simplified top plan view of selected parts of the shift position control mechanism for the bicycle control device illustrated in FIGS. 1-5, with the positioning plate and the releasing plate in their normal rest positions when the bicycle control device is in the ninth gear position.
Figure 23:
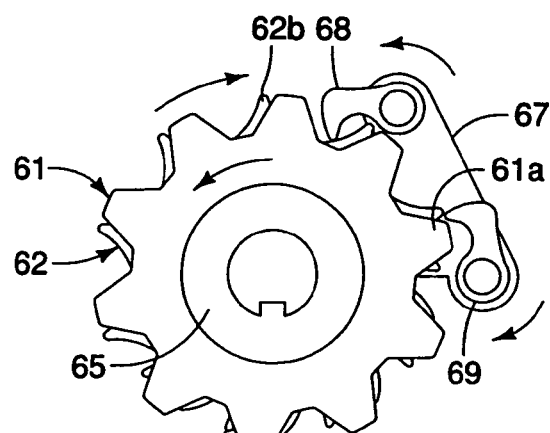
FIG. 23 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the ninth gear position to the eighth gear position.
Figure 24:
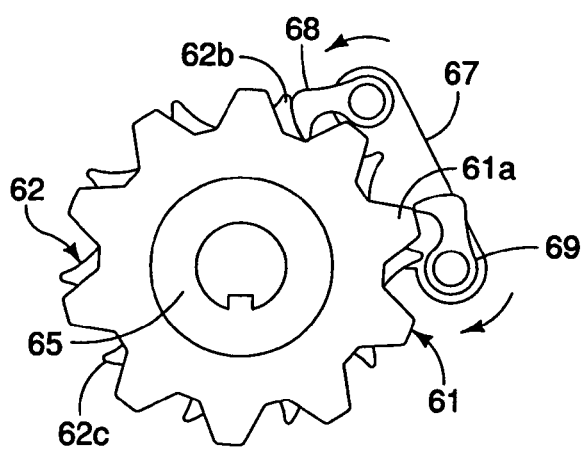
FIG. 24 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the ninth gear position to the eighth gear position is completed.
Figure 25:
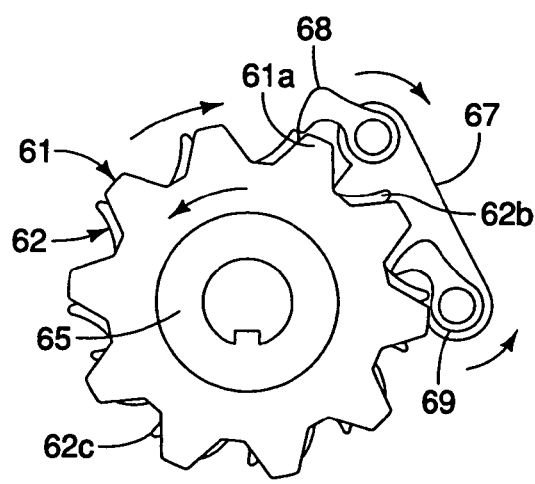
FIG. 25 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the eighth gear position to the seventh gear position.
Figure 26:
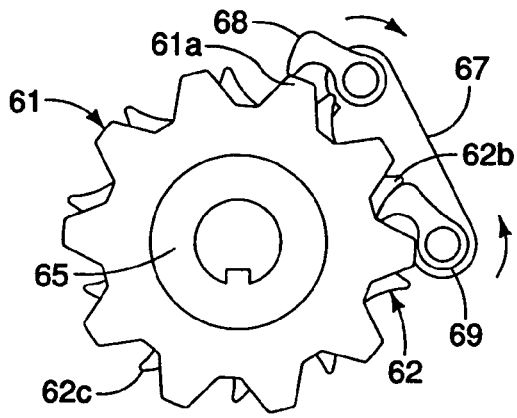
FIG. 26 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the eighth gear position to the seventh gear position is completed.
Figure 27:
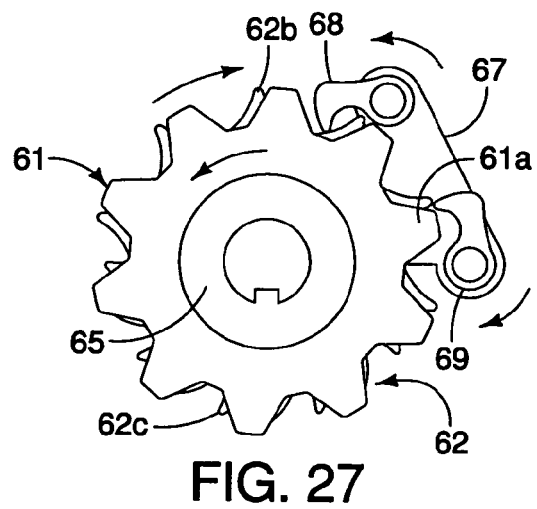
FIG. 27 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the seventh gear position to the sixth gear position.
Figure 28:
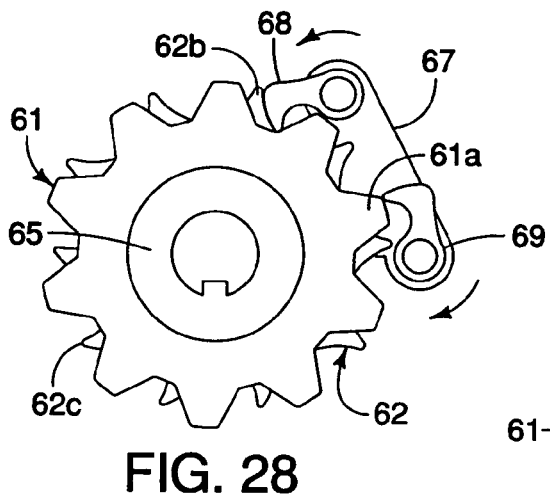
FIG. 28 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the seventh gear position to the sixth gear position is completed.
Figure 29:
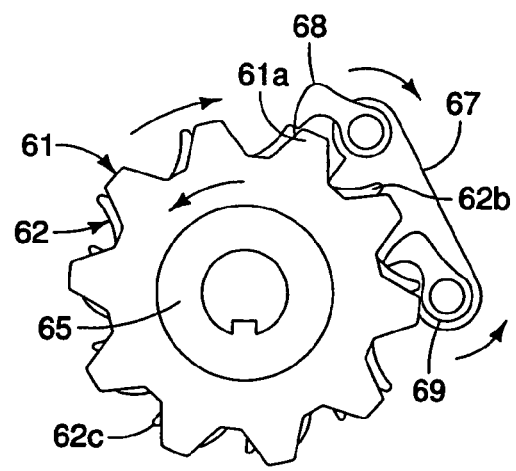
FIG. 29 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the sixth gear position to the fifth gear position.
Figure 30:
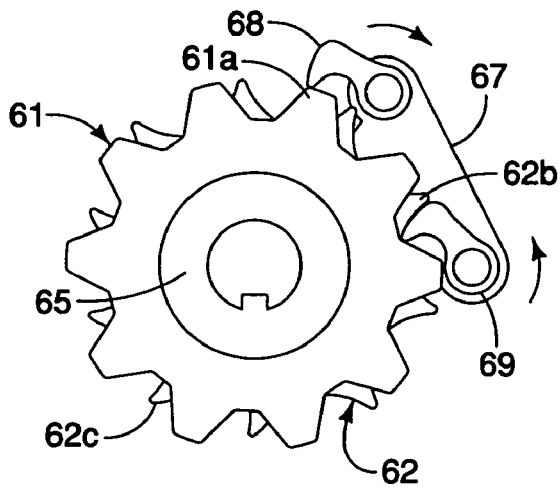
FIG. 30 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the sixth gear position to the fifth gear position is completed.
Figure 31:
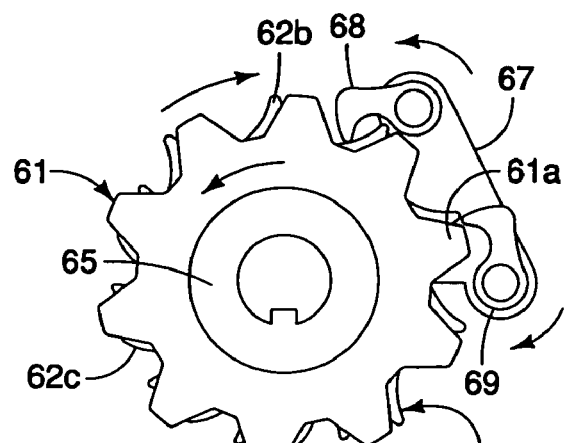
FIG. 31 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the fifth gear position to the fourth gear position.
Figure 32:
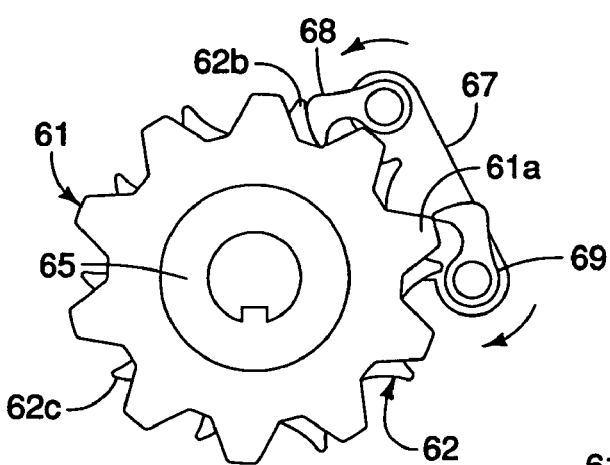
FIG. 32 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the fifth gear position to the fourth gear position is completed.
Figure 33:
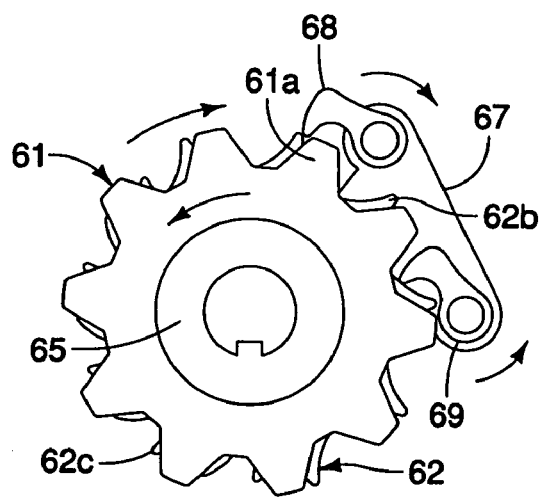
FIG. 33 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the fourth gear position to the third gear position.
Figure 34:
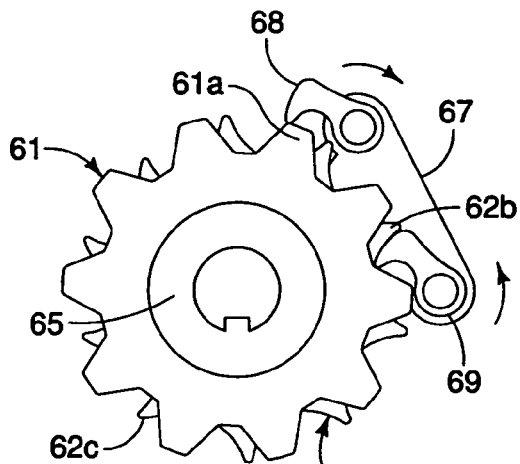
FIG. 34 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the fourth gear position to the third gear position is completed.
Figure 35:
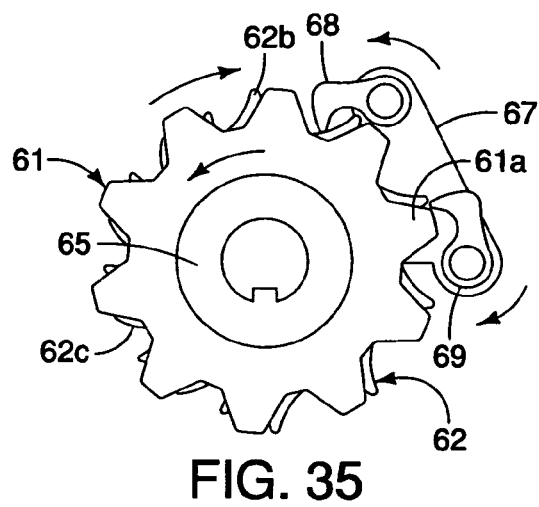
FIG. 35 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the third gear position to the second gear position.
Figure 36:
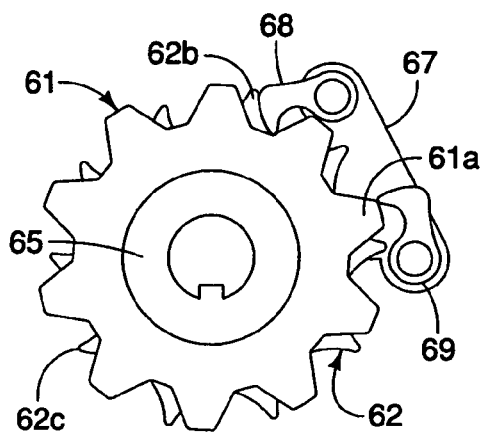
FIG. 36 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the third gear position to the second gear position is completed.
Figure 37:
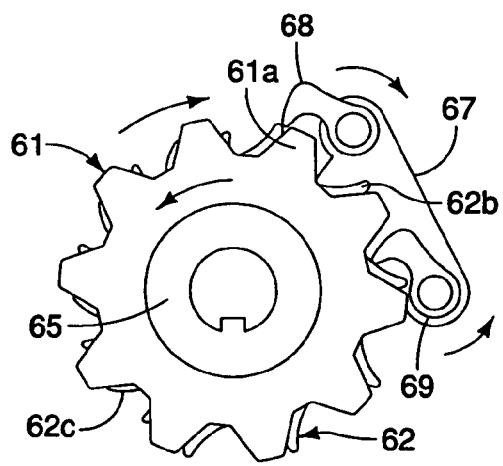
FIG. 37 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the second gear position to the first gear position.
Figure 38:
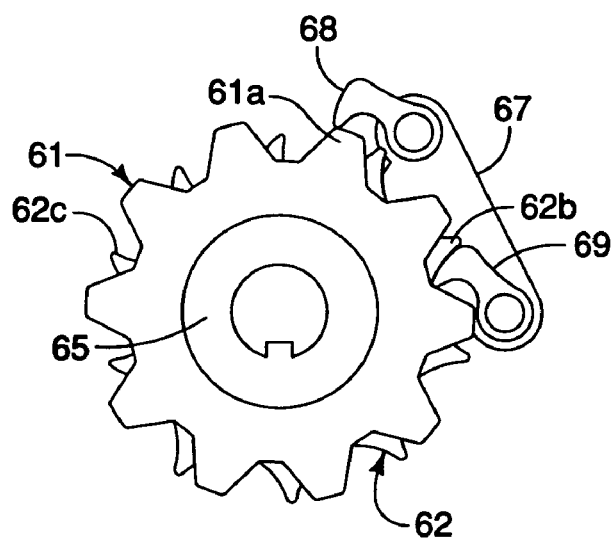
FIG. 38 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the second gear position to the first gear position is completed.

As best seen FIG. 5, the housing 40 of the shifting unit 33 basically includes an upper casing 40a and a lower casing 40b that are coupled together by a fastener or screw 44. The upper and lower casings 40a and 40b are preferably constructed of a light weight material such a hard rigid plastic material. The housing 40 is sized and configured to form an internal cavity for receiving the shift wire releasing assembly 41, the shift wire winding assembly 42 and the bicycle shift position control mechanism 43 therein. The upper casing 40a is provided with a upper keyed shaft or post 40c, while the lower casing 40b is provided with a lower keyed shaft or post 40d. The posts 40c and 40d are designed to prevent rotational movement of selected parts of the shift unit 33 as will become apparent from the description below.

As best seen FIG. 5, the shift wire releasing assembly 41 of the shifting unit 33 basically includes a shift release lever 45 with a release pawl 46, a shift release lever return spring 47 and a shift release lever control plate 48. The shift wire releasing assembly 41 is configured and arranged such that the rider can easily operate the shift release lever 45 to perform a shifting operation as FIGS. 22-38.

The shift release lever 45 preferably has an internal mounting portion 45a and an external rider operating portion 45b. The internal mounting portion 45a is configured and arranged to pivot around the outer periphery of the upper post 40c such that the shift release lever 45 can move between a rest position and a shift release position. The internal mounting portion 45a preferably includes a mounting tab 45c for pivotally supporting the release pawl 46 and a stop flange 45d for maintaining the shift release lever 45 in the rest position due to the biasing force of the release lever return spring 47. Thus, movement of the shift release lever 45 causes the release pawl 46 to rotate therewith about the center axis of the upper post 40c.

The release pawl 46 is mounted to the mounting tab 45c via a mounting pin 46a that is riveted onto the mounting tab 45c. The release pawl 46 is held on the mounting pin 46a by a retaining clip 46b. Moreover, the release pawl 46 is biased in a counterclockwise direction by a torsion spring 46c as seen in FIG. 5. The torsion spring 46c has a first end of the torsion spring 46c engaging the release pawl 46 and a second end of the torsion spring 46c engaging the mounting tab 46c of the shift release lever 45. As explained below, the release pawl 46 is configured and arranged to selectively engage the bicycle shift position control mechanism 43 when the shift release lever 45 is pivoted from its rest position to its shift release position.

The release lever return spring 47 is preferably a torsion spring having a first end 47a engaging the shift release lever 45 and a second end 47b engaging the shift release lever control plate 48. The release lever return spring 47 biases the shift release lever 45 in a clockwise direction as seen in FIG. 5. Accordingly, the shift release lever 45 and the release lever return spring 47 cooperate together such that the shift release lever 45 as a trigger action in which the shift release lever 45 automatically springs back to its rest position after being moved to a shift release position. Preferably, the first end 47a of the release lever return spring 47 is hooked on to the mounting tab 45c to bias the shift release lever 45 in the clockwise direction.

The shift release lever control plate 48 is preferably a flat plate with a center opening 48a that is keyed such that it engages the upper post 40c to prevent rotational movement therebetween. The shift release lever control plate 48 also has a hole 48b for receiving the second end 47b of the shift lever return spring 47 therein. A stop member or flange 48c is formed on the outer periphery of the shift release lever control plate 48 to act as a stop for the shift release lever 45. In particular, the stop flange 45d of the shift release lever 45 is normally biased against the stop member 48c.

As best seen FIG. 5, the shift wire winding assembly 42 of the shifting unit 33 basically includes a shift winding lever 50 with a winding pawl 51, a shift winding lever return spring 52 and a shift winding lever control plate 53. The shift wire winding assembly 42 is configured and arranged such that the rider can easily operate the shift winding lever 50 to perform a shift winding operation as FIGS. 6-22.

The shift winding lever 50 basically includes an internal mounting portion 50a and an external rider operating portion 50b. The internal mounting portion 50a is configured and arranged to pivot around the outer periphery of the upper post 40c such that the shift winding lever 50 can move between a rest position and a shift winding position. The internal mounting portion 50a preferably includes a mounting tab 50c for pivotally supporting the winding pawl 51 and a stop flange 50d for maintaining the shift winding lever 50 in the rest position due to the biasing force of the winding lever return spring 52. Thus, movement of the shift winding lever 50 causes the winding pawl 51 to rotate therewith about the center axis of the upper post 40c.

The winding pawl 51 is mounted to the mounting tab 50c via a mounting pin 51a that is riveted onto the mounting tab 50c. The winding pawl 51 is held on the mounting pin 51a by a retaining clip 51b. Moreover, the winding pawl 51 is biased in a counterclockwise direction by a torsion spring 51c as seen in FIG. 5. The torsion spring 51c has a first end of the torsion spring 51c engaging the winding pawl 51 and a second end of the torsion spring 51c engaging the mounting tab 50c of the shift winding lever 50. As explained below, the winding pawl 51 is configured and arranged to selectively engage the bicycle shift position control mechanism 43 when the shift winding lever 50 is pivoted from its rest position to its shift release position.

The winding lever return spring 52 is preferably a torsion spring having a first end 52a engaging the shift winding lever 50 and a second end 52b engaging the shift winding lever control plate 53. The winding lever return spring 52 biases the shift winding lever 50 in a clockwise direction as seen in FIG. 5. Accordingly, the shift winding lever 50 and the winding lever return spring 52 cooperate together such that the shift winding lever 50 as a trigger action in which the shift winding lever 50 automatically springs back to its rest position after being moved to a shift release position. Preferably, the first end 52a of the winding lever return spring 52 is hooked on to the mounting tab 50c to bias the shift winding lever 50 in the clockwise direction.

The shift winding lever control plate 53 is preferably a flat plate with a center opening 53a that is keyed such that it engages the upper post 40c to prevent rotational movement therebetween. The shift winding lever control plate 53 also has a hole 53b for receiving the second end 52b of the winding lever return spring 52 therein. A stop member or flange 53c is formed on the outer periphery of the shift winding lever control plate 53 to act as a stop for the shift winding lever 50. In particular, the stop flange 50d of the shift winding lever 50 is normally biased against the stop member 53c.

As best seen FIG. 5, the bicycle shift position control mechanism 43 of the shifting unit 33 basically includes a pawl cam plate 60, a releasing member or plate 61, a positioning member or plate 62, a wire take up member 63, a compression spring 64, a spacer 65, a wire take up release spring or biasing member 66, a mounting plate 67, a first position maintaining member or pawl 68 and a second position maintaining member or pawl 69.

The pawl cam plate 60 is a flat rigid metal plate that is fixed to the housing 40 so that it does not rotate or move. In particular, the pawl cam plate 60 has a center opening 60a that is keyed so as to mate with the post 40c of the upper casing 40a. Of course, other non-circular cross sections can be utilized to prevent relative rotation between the pawl cam plate 60 and the housing 40. The pawl cam plate 60 preferably includes a release pawl holding projection 60b and a winding pawl holding projection 60c. The pawl holding projections 60b and 60c are preferably formed peripheral edge of the pawl cam plate 60. The release pawl holding projection 60b is configured and arranged to hold the release pawl 46 in a disengaged or rest position against the biasing force of the spring 46c. Similarly, the winding pawl holding projection 60c is configured and arranged to hold the winding pawl 51 in a disengaged or rest position against the biasing force of the spring 51c.

The releasing member or plate 61 is preferably a flat metal plate that is mounted on the post 40d to rotate around the peripheral surface of the post 40d. The releasing plate 61 is configured and arranged to selectively move the first position maintaining pawl 68 between a first engagement position and a first disengagement position, and to selectively move the second position maintaining pawl 69 between a second engagement position and a second disengagement position as will become apparent from the following discussion. Moreover, the releasing plate 61 is configured and arranged to selectively release the positioning plate 62 from the first and second position maintaining pawls 68 and 69 to cause the positioning plate 62 to rotate one shift position of the predetermined shift positions when the releasing plate 61 is moved a first predetermined amount by the shift release lever 45, and to cause the positioning member to rotate two consecutive shift positions of the predetermined shift positions when the releasing plate 61 is moved a second predetermined amount in a single progressive shift operation of the shift release lever 45.

The release plate 61 is rotated in a counterclockwise direction by the shift release lever 45. Preferably, the shift release lever 45 and the releasing plate 61 are configured and arranged such that multiple shifting operations are possible with a single progressive movement of the shift release lever 45. The releasing plate 61 includes a plurality of camming teeth 61a which are selectively engaged by the release pawl 46 for rotating the releasing plate 61. The release plate 61 also includes a plurality of ramp shaped detents 61b that are circumferentially spaced apart on its lower surfaces to form part of a one way clutch that cooperates with the positioning member 62 so that the releasing plate 61 can rotate in a counterclockwise direction relative to the positioning plate 62.

The positioning member or plate 62 is preferably a flat metal plate that is freely rotatable about the post 40c. The positioning plate 62 is fixed to the wire take up member 63 such that they rotate together in response to movement of either the shift release lever 45 or the shift winding lever 50. More specifically, the positioning plate 62 is biased in a clockwise direction by the wire take up release spring 66, but normally held in one of the nine shift positions by either the first position maintaining pawl 68 or the second position maintaining pawl 69.

The positioning plate 62 preferably includes a non-circular opening 62a that is configured and arranged to mate with the wire take up member 63 to prevent relative rotation therebetween. Preferably, the peripheral surface of the positioning plate 62 is provided with six shift positioning teeth 62b and ten shift winding teeth 62c. The shift positioning teeth 62b are configured and arranged to selectively engage the first and second position maintaining pawls 68 and 69 such that the wire take up member 63 can be selectively held in one of the nine different shift positions. The shift winding teeth 62c are configured and arranged to be selectively engaged by the tooth of the winding pawls 51 of the shift winding lever 50.

The positioning plate 62 also includes a plurality of ramp shaped recesses 62d which engage the ramp shaped detents 61b to allow rotational movement in only one direction. In particular, the ramp shaped detents 61b and the ramp shaped recesses 62d cooperate together with the compression spring 64 to form a one way clutch. Thus, the releasing plate 61 rotates independently in a counterclockwise direction relative to the positioning plate 62 when the releasing plate 61 is rotated, but the releasing plate 61 and the positioning plate 62 move together in the counterclockwise direction when the positioning plate 62 is rotated. In other words, the releasing plate 61 is fixed to the positioning plate 62 by the ramp shaped detents 61b and the ramp shaped recesses 62d when the positioning member 62 is rotated in the counterclockwise direction by the winding pawl 51 engaging one of the shift winding teeth 62c. However, the releasing plate 61 rotates relative to the positioning plate 62 when the releasing plate 61 is rotated in a counterclockwise direction and the positioning plate 62 is rotated in the clockwise direction by the wire take up release spring 66.

In particular, when the shift winding lever 50 is in the rest position, the winding pawl 51 has its tooth resting on the winding pawl holding projection 60c of the pawl cam plate 60. However, when the shift winding lever 60 is rotated from its rest position to a shift position, then the winding pawl 51 moves off of the winding pawl holding projection 60c and moves into engagement with the shift winding teeth 62c so as to rotate the positioning plate 62. Since the positioning plate 62 is connected to the wire take up member 63, the positioning plate 62 and the wire take up member 63 move together. Also, due to the one way clutch form between the releasing plate 61 and the positioning plate 62, the releasing plate 61 and the positioning plate 62 also rotate together in response to movement of the shift winding lever 50.

The wire take up member 63 is a conventional type wire take up spool in which the inner wire 18a is round along the peripheral edge surface of the wire take up member 63 as the wire take up member 63 is rotated in a counterclockwise direction. Thus, the wire take up member 63 has a center opening 63a that is rotatably mounted on the post 40c. The peripheral edge of the wire take up member 63 has a wire attachment opening 63b for attaching the inner wire 18a of the shift cable 18 thereto. Also, the peripheral edge of the wire take up member 63 has a hook member 63c for attaching the wire take up release spring 66 thereto. Thus, the wire take up release spring 66 biases the wire take up member 63 in a clockwise direction, i.e., a shift release direction. The upper surface of the wire take up member 63 has a plurality of projections 63d which engage a plurality of recesses formed in the opening 62a of the positioning plate 62. Thus, the positioning plate 62a and the wire take up member 63 are coupled together so as that they rotate together as a unit when the shifting unit 33 is in the assembled state.

The wire take up release spring 66 is preferably a torsion spring having a first end 66a attached to the hook 63c of the wire take up member 63, and a second end 64b coupled to the mounting plate 67. The wire take up release spring 66 applies a biasing force to urge the wire take up member 63 in the clockwise direction.

The spacer 65 is a hat shaped member having a flat base plate 65a and a tubular member 65b. The base member 65a is configured and arranged so as to prevent the wire take up release spring 66 from being compressed when the shift unit 33 is assembled. The tubular portion 65b is non-rotatably secured to the lower post 40d and maintains proper spacing between the wire take up member 63 and the compression spring 64.

The first position maintaining pawl 68 is fixedly coupled to the mounting plate via a pin 68a which is riveted onto the mounting plate 67. The first position maintaining pawl 68 is held on the mounting pin 68a by a retaining clip 68b. Moreover, the first position maintaining pawl 68 is biased in a counterclockwise direction by a torsion spring 68c as seen in FIG. 5. The torsion spring 68c has a first end of the torsion spring 68c engaging the first position maintaining pawl 68 and a second end of the torsion spring 68c engaging the mounting plate 67. Thus, the first position maintaining pawl 68 configured and arranged to selectively move between a first engagement position that holds the positioning plate 62 in one of the predetermined shift positions and a first disengagement position that releases the positioning plate 62 for rotational movement.

The second position maintaining pawl 69 is fixedly coupled to the mounting plate via a pin 69a which is riveted onto the mounting plate 67. The second position maintaining pawl 69 is held on the mounting pin 69a by a retaining clip 69b. Moreover, the second position maintaining pawl 69 is biased in a counterclockwise direction by a torsion spring 69c as seen in FIG. 5. The torsion spring 69c has a first end of the torsion spring 69c engaging the second position maintaining pawl 69 and a second end of the torsion spring 69c engaging the mounting plate 67. Thus, the second position maintaining pawl 69 configured and arranged to selectively move between a second engagement position that holds the positioning plate 62 in one of the predetermined shift positions and a second disengagement position that releases the positioning plate 62 for rotational movement.

The first and second position maintaining pawls 68 and 69 are configured and arranged to alternately engage adjacent teeth of the positioning plate 62 as the first and second position maintaining pawls 68 and 69 are moved by the rotation of the release plate to perform a shifting operation between sequential shift positions of the predetermined shift positions.

As seen in FIGS. 6 to 22, a shifting operation from the first gear position to the ninth gear position is illustrated in which the positioning plate 62 and the releasing plate 61 are rotated together by the rider pushing the shift winding lever 50. In particular, the rotation of the releasing plate 61 and the positioning plate 62 causes the first and second position maintaining pawls 68 and 69 to be moved and/or held out of engagement with the positioning teeth 62b of the positioning plate 62 by one of the camming teeth 61a of the releasing plate 61 against the urging force of the springs 68c and 69c. Once the releasing plate 61 and the positioning plate 62 have been moved a predetermined amount, one of the first and second position maintaining pawls 68 and 69 will be forced back into the path of the positioning teeth 62b of the positioning plate 62 by the urging force of its springs 68c or 69c, while the other of the first and second position maintaining pawls 68 and 69 will be held out of engagement from the positioning teeth 62b of the positioning plate 62 by one of the camming teeth 61a of the releasing plate 61. This upshifting can be performed in a single progressively movement of the shift winding lever 50 without stopping or returning to the shift winding lever 50 to the rest position such that multiple gears shifts occur in the single shift operation.

Referring to FIGS. 22 to 38, a shifting operation from the ninth gear position to the first gear position is illustrated in which the releasing plate 61 is rotated together by the rider pushing the shift release lever 45. In particular, the rotation of the releasing plate 61 causes the first and second position maintaining pawls 68 and 69 to be moved and/or held out of engagement with the positioning teeth 62b of the positioning plate 62 by one of the camming teeth 61a of the releasing plate 61 against the urging force of the springs 68c and 69c. Once the releasing plate 61 has been moved a predetermined amount, one of the first and second position maintaining pawls 68 and 69 will be forced back into the path of the positioning teeth 62b of the positioning plate 62 by the urging force of the springs 68c and 69c, while the other of the first and second position maintaining pawls 68 and 69 will be held out of engagement from the positioning teeth 62b of the positioning plate 62 by one of the camming teeth 61a of the releasing plate 61. This shifting can be performed in a single progressively movement of the shift release lever 45 without stopping or returning to the shift release lever 45 to the rest position such that multiple gears shifts occur in the single shift operation.

Second Embodiment

Referring now to FIG. 39-47, a portion of a modified shift position control mechanism 143 in accordance with the second embodiment of the present invention is illustrated. The shift position control mechanism 143 is used in the shift unit 33 of the first embodiment by replacing the corresponding parts. The shift position control mechanism 143 is identical to the shift position control mechanism 43 of the first embodiment, except that the bicycle shift position control mechanism 43 has been slightly modified as explained below. In view of the similarities between the first and second embodiments, the parts of the second embodiment that are identical to the first embodiment will be kept the same reference numerals. Moreover, the descriptions of the common parts will be omitted for the sake of brevity.

Figure 39:
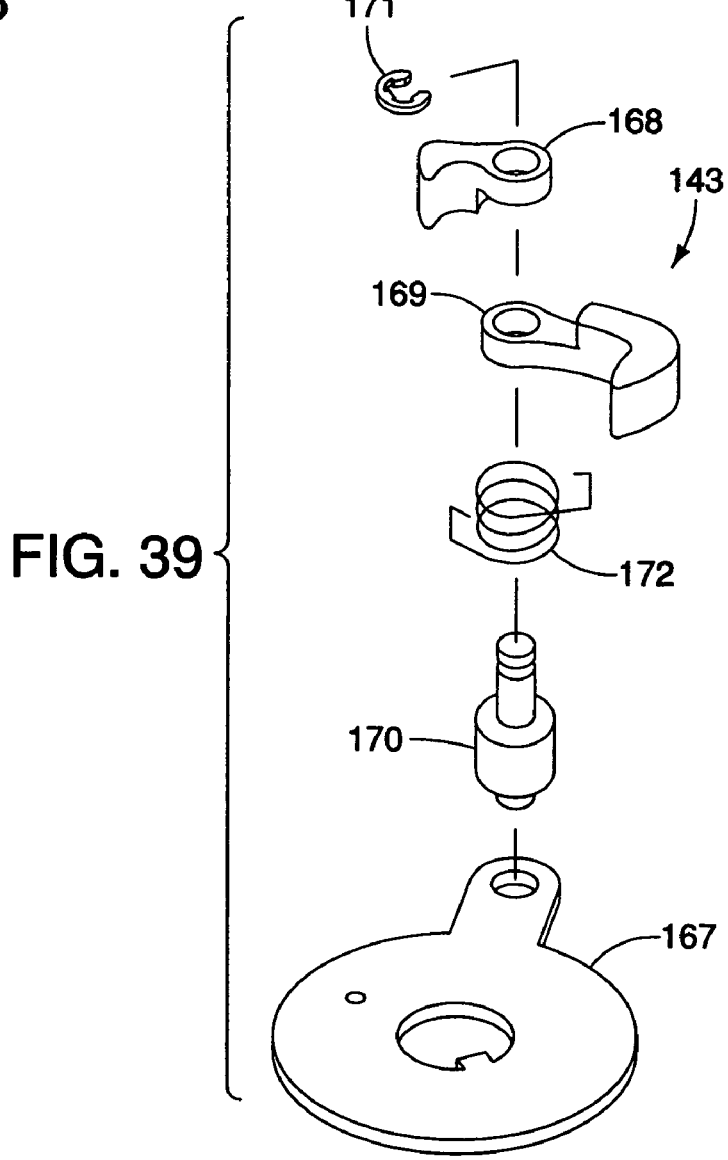
FIG. 39 is an exploded perspective view of a modified shift position control mechanism to be used in the bicycle control device illustrated in FIGS. 1-4 in accordance with a second embodiment of the present invention.

Basically, the shift position control mechanism 143 includes the all of the parts of the first embodiment, but the mounting plate 67 and the position maintaining pawls 68 and 69 have been replaced with a modified mounting plate 167 and modified first and second position maintaining pawls 168 and 169. In this embodiment, as seen in FIG. 39, the first and second position maintaining pawls 168 and 169 are mounted on a single mounting pin 170 to the mounting plate 167. The one end of the single mounting pin 170 is riveted to the mounting plate 167 and the other end receives a retaining clip 171 to hold the first and second position maintaining pawls 168 and 169 on the single mounting pin 170. A single biasing element or torsion spring 172 is used to bias the first and second position maintaining pawls 168 and 169 in opposite directions about the single mounting pin 170. The operation of the first and second position maintaining pawls 168 and 169 is the same as the first embodiment.

As seen in FIGS. 40 to 44, a shifting operation from the first gear position to the third gear position is illustrated in which the positioning plate 62 and the releasing plate 61 are rotated together by the rider pushing the shift winding lever 50. In particular, the rotation of the releasing plate 61 and the positioning plate 62 causes the first and second position maintaining pawls 168 and 169 to be moved and/or held out of engagement with the positioning teeth 62b of the positioning plate 62 by one of the camming teeth 61a of the releasing plate 61 against the urging force of the spring 172. Once the releasing plate 61 and the positioning plate 62 have been moved a predetermined amount, one of the first and second position maintaining pawls 168 and 169 will be forced back into the path of the positioning teeth 62b of the positioning plate 62 by the urging force of the spring 172, while the other of the first and second position maintaining pawls 168 and 169 will be held out of engagement from the positioning teeth 62b of the positioning plate 62 by one of the camming teeth 61a of the releasing plate 61. This upshifting can be performed in a single progressively movement of the shift winding lever 50 without stopping or returning to the shift winding lever 50 to the rest position.

Figure 40:
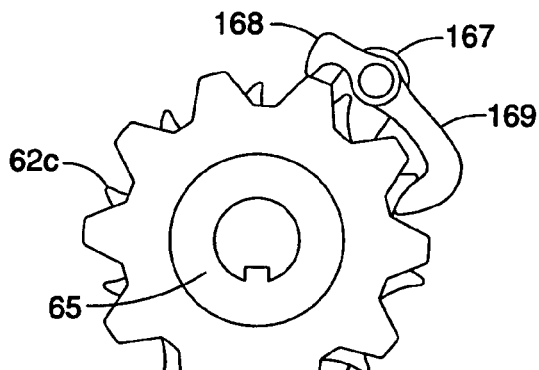
FIG. 40 is a simplified top plan view of selected parts of the shift position control mechanism illustrated in FIG. 39, with the positioning plate and the releasing plate in their normal rest positions when the bicycle control device is in the first gear position, i.e., the inner wire of the rear shift cable being fully released from the wire takeup member.
Figure 41:
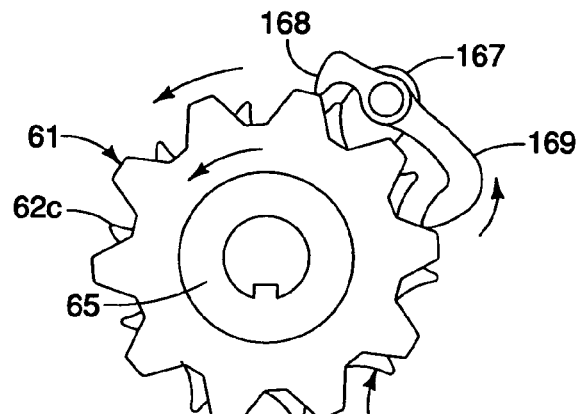
FIG. 41 is a simplified rear side elevational view of the shift position control mechanism illustrated in FIG. 39, with the positioning plate and the releasing plate being rotated together by the winding lever in the shift winding direction such that the releasing plate moves the first and second position maintaining members or pawls out of engagement with the positioning plate and the releasing plate for performing a shift from the first gear position to the second gear position.
Figure 42:
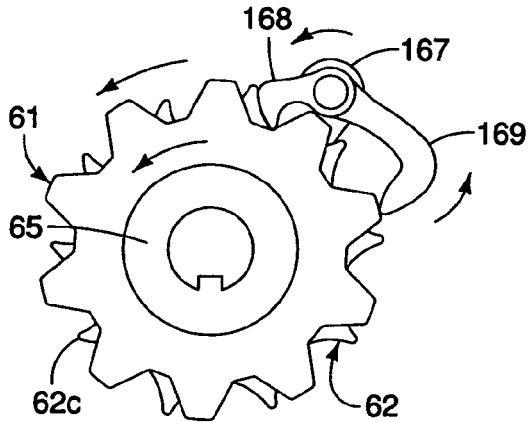
FIG. 42 is a simplified top plan view of selected parts of the shift position control mechanism illustrated in FIG. 39, with the positioning plate and the releasing plate in their normal rest positions when the bicycle control device is in the second gear position.
Figure 43:
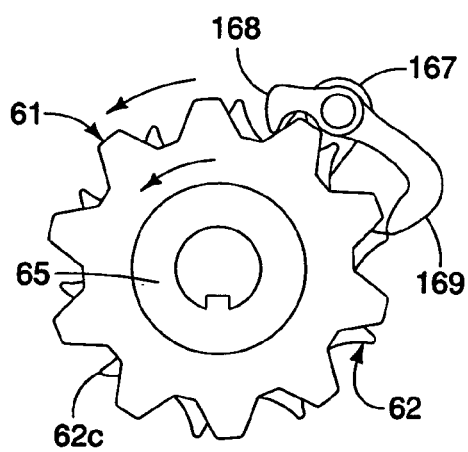
FIG. 43 is a simplified rear side elevational view of the shift position control mechanism illustrated in FIG. 39, with the positioning plate and the releasing plate being rotated together by the winding lever in the shift winding direction such that the releasing plate moves the first and second position maintaining pawls out of engagement with the positioning plate and the releasing plate for performing a shift from the second gear position to the third gear position.
Figure 44:
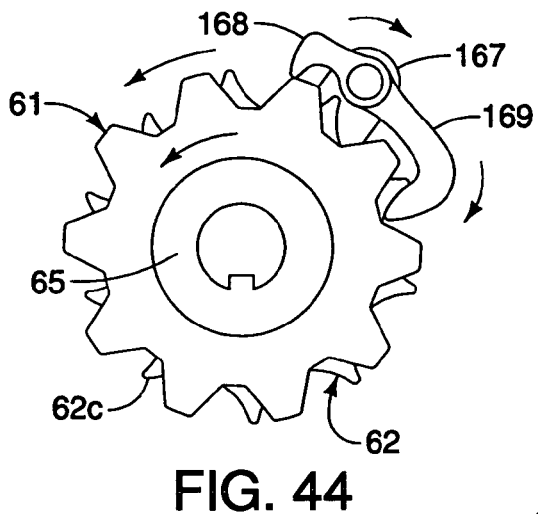
FIG. 44 is a simplified top plan view of selected parts of the shift position control mechanism illustrated in FIG. 39, with the positioning plate and the releasing plate in their normal rest positions when the bicycle control device is in the third gear position.
Figure 45:
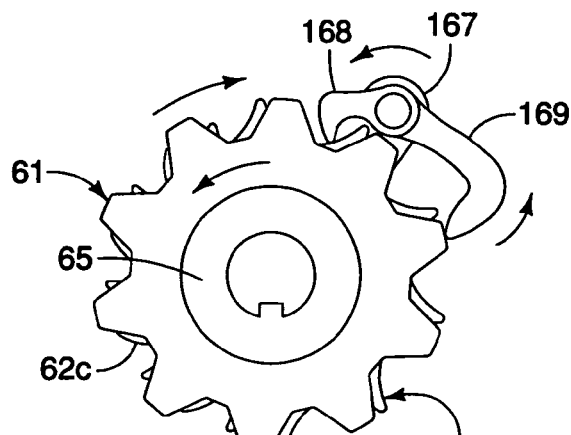
FIG. 45 is a simplified rear side elevational view of the shift position control mechanism illustrated in FIG. 39, with the releasing plate being rotated by the release lever in the shift winding direction such that one of the position maintaining pawls is moved out of engagement with the positioning plate and the other position maintaining pawl moves in the path of the positioning plate for starting a shift from the third gear position to the second gear position.
Figure 46:
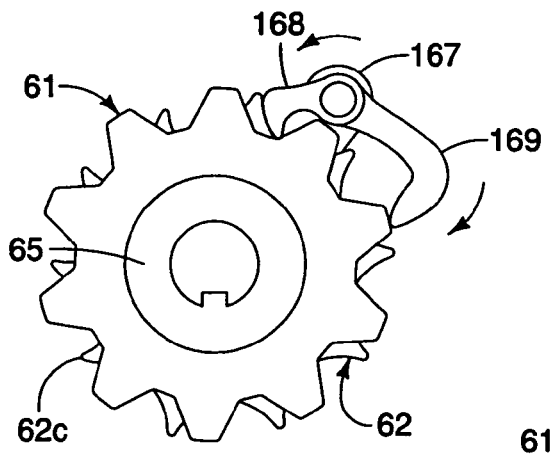
FIG. 46 is a simplified rear side elevational view of the shift position control mechanism illustrated in FIG. 39, with the positioning plate being rotated by the release spring in the shift releasing direction after the releasing plate has been rotated by the release lever in the shift winding direction such that the shift operation from the third gear position to the second gear position is completed.
Figure 47:
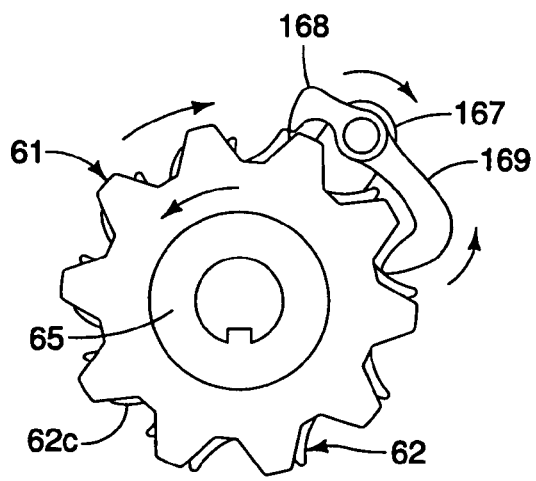
FIG. 47 is a simplified rear side elevational view of the shift position control mechanism illustrated in FIG. 39, with the releasing plate being rotated by the release lever in the shift winding direction such that one of the position maintaining pawls is moved out of engagement with the positioning plate and the other position maintaining pawl moves in the path of the positioning plate for starting a shift from the second gear position to the first gear position.

Referring to FIGS. 44 to 47 and then back to FIG. 40, a shifting operation from the third gear position to the first gear position is illustrated in which the releasing plate 61 is rotated together by the rider pushing the shift release lever 45. In particular, the rotation of the releasing plate 61 causes the first and second position maintaining pawls 168 and 169 to be moved and/or held out of engagement with the positioning teeth 62b of the positioning plate 62 by one of the camming teeth 61a of the releasing plate 61 against the urging force of the spring 172. Once the releasing plate 61 has been moved a predetermined amount, one of the first and second position maintaining pawls 168 and 169 will be forced back into the path of the positioning teeth 62b of the positioning plate 62 by the urging force of the spring 172, while the other of the first and second position maintaining pawls 168 and 169 will be held out of engagement from the positioning teeth 62b of the positioning plate 62 by one of the camming teeth 61a of the releasing plate 61. This shifting can be performed in a single progressively movement of the shift release lever 45 without stopping or returning to the shift release lever 45 to the rest position.

Third Embodiment

Referring now to FIG. 48-60, a shifting unit 233 is illustrated in accordance with the third embodiment of the present invention. The shifting unit 233 replaces the shifting unit 33 of the bicycle control device 12 of the first embodiment. In view of the similarities between the first and third embodiments, the parts of the third embodiment that are identical to the first embodiment will be kept the same reference numerals. Moreover, the descriptions of the common parts will be omitted for the sake of brevity. Basically, the shifting unit 233 includes a housing 240, a shift wire releasing assembly 241, a shift wire winding mechanism assembly 242 and a bicycle shift control mechanism 243. The shifting unit 233 is configured and arranged such that the inner wire 18a of the shift control cable 18 can be pulled and released to selectively effect either a single-stage gear shift operation or a multiple-stage gear shift operation in a single progress shifting operation as explained below.

Figure 48:
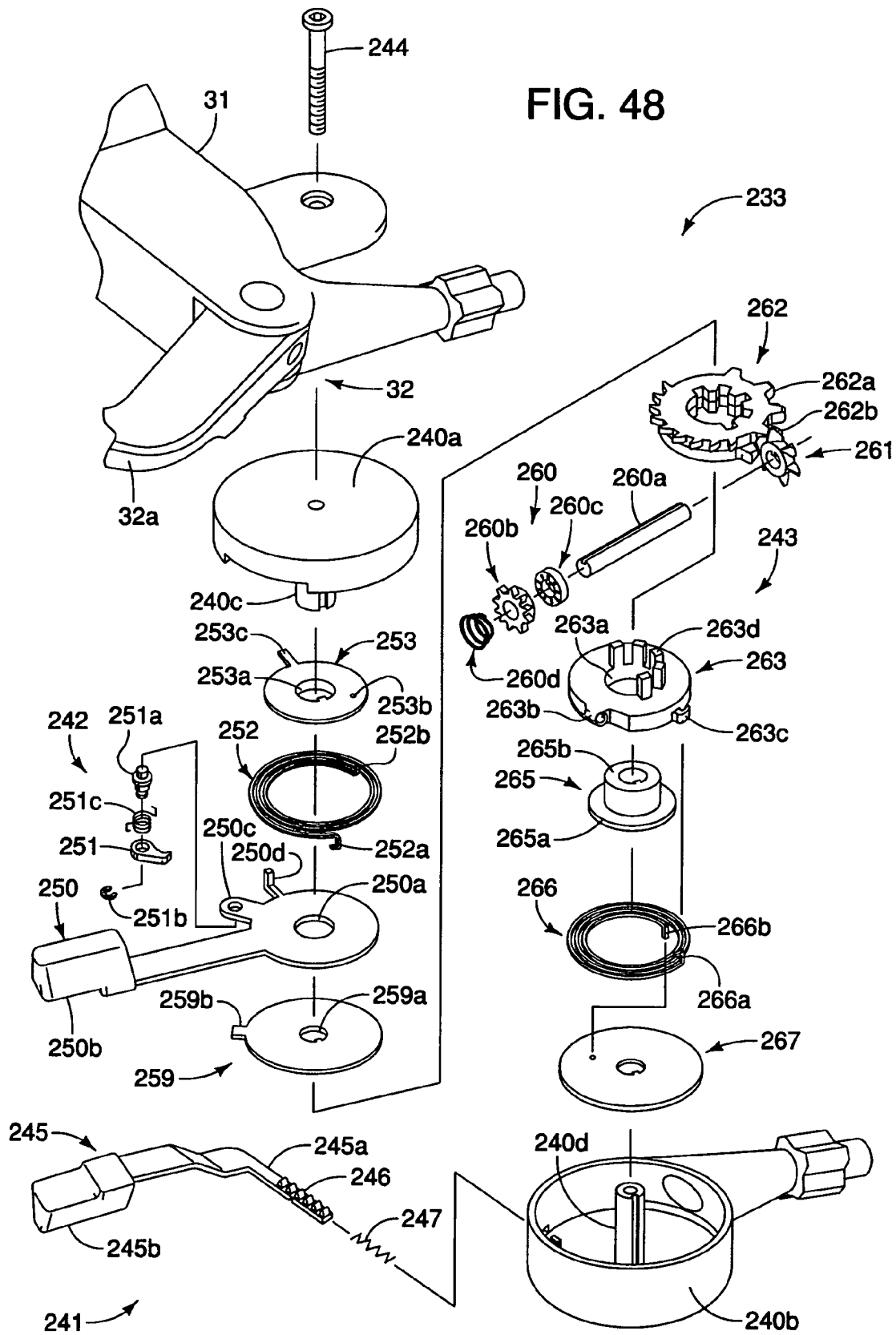
FIG. 48 is an exploded perspective view of a modified bicycle control device in accordance with a third embodiment of the present invention.
Figure 49:
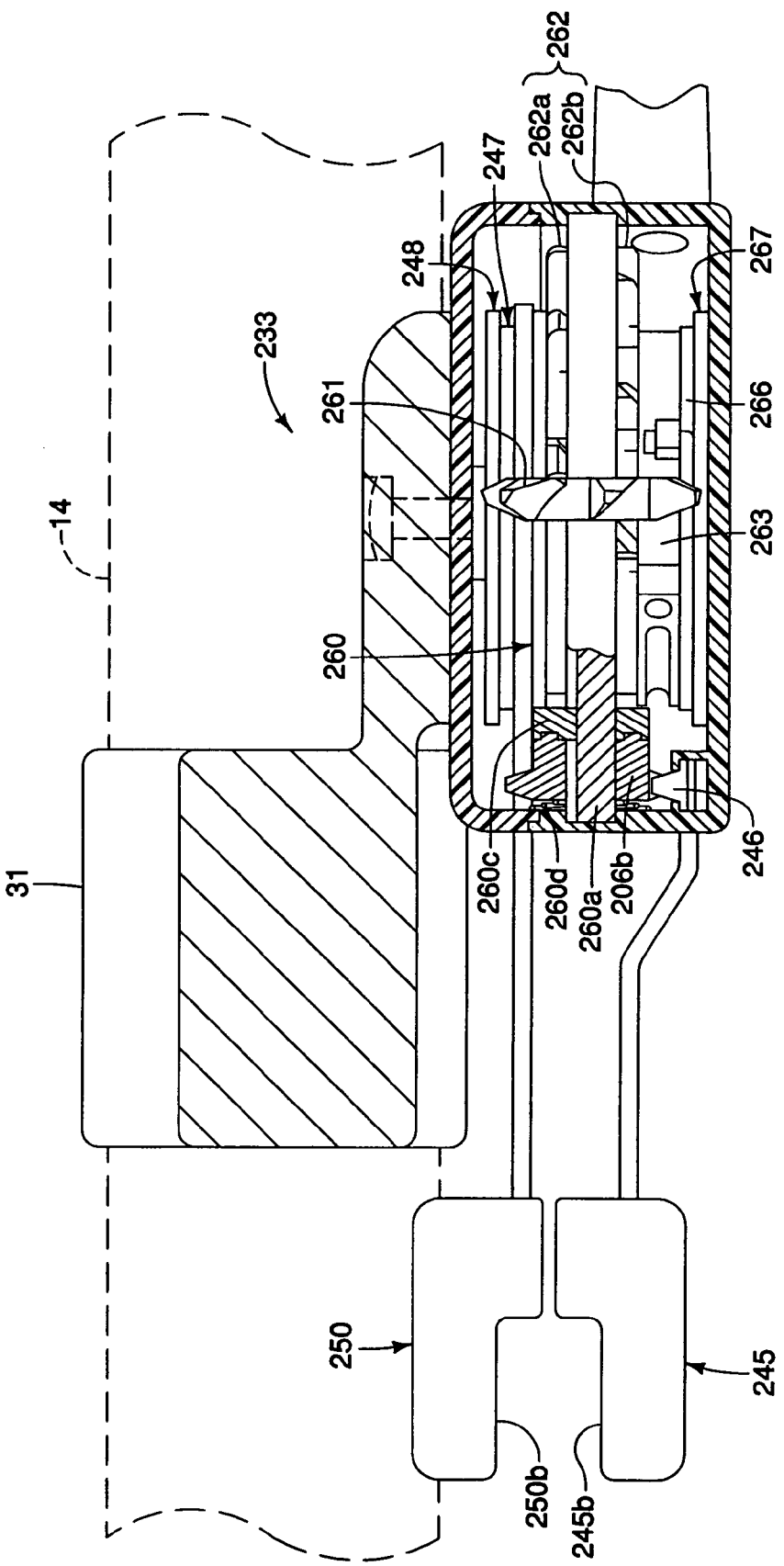
FIG. 49 is a partial cross sectional view of the bicycle control device illustrated in FIG. 48 in accordance with the third embodiment of the present invention.
Figure 50:
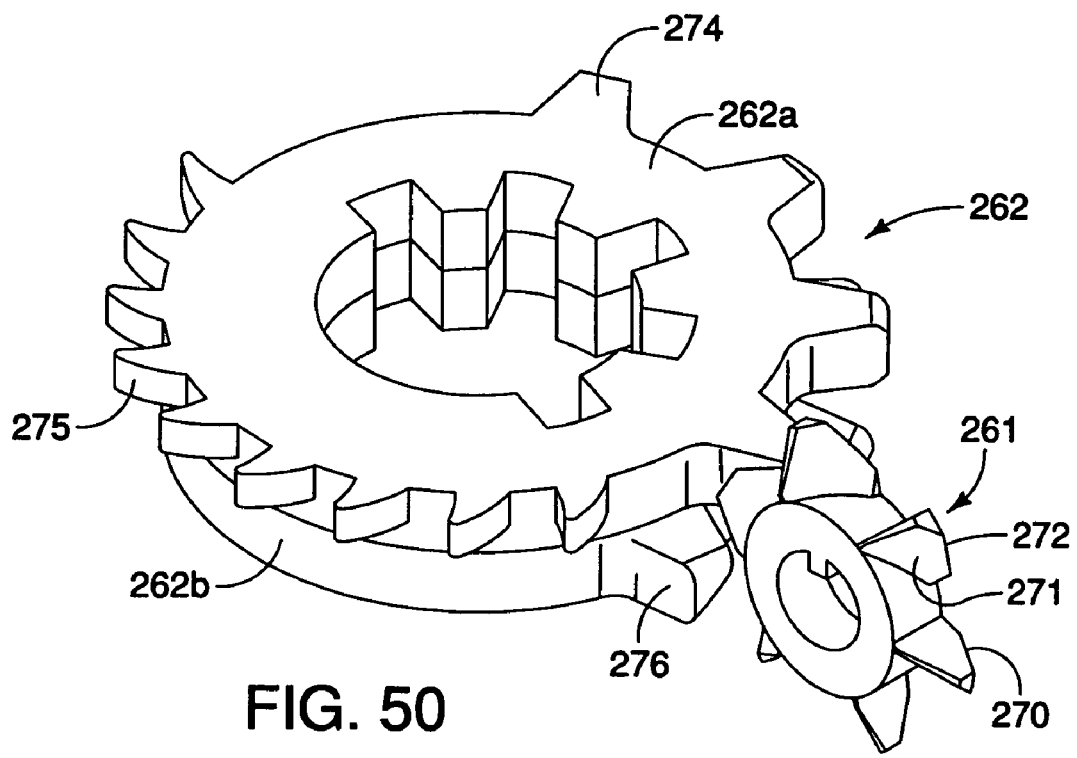
FIG. 50 is a perspective view of the selected parts of the shift position control mechanism illustrated in FIGS. 48 and 49 with the positioning plate being in the top position.
Figure 51:
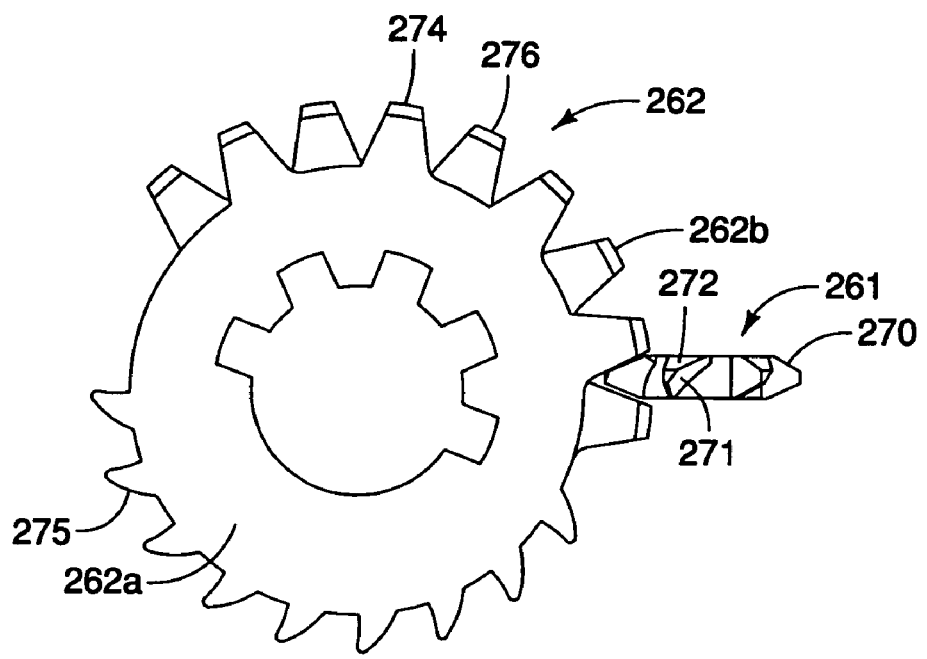
FIG. 51 is a top plan view of the selected parts of the shift position control mechanism of illustrated in FIG. 50 with the positioning plate being in the top position.
Figure 52:
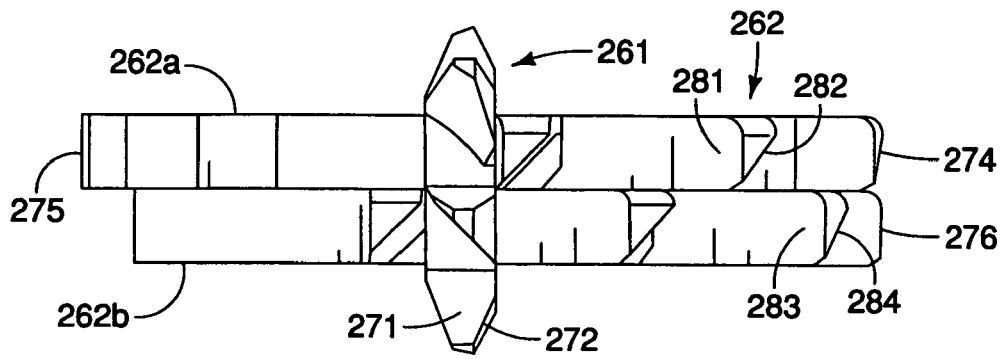
FIG. 52 is a first side elevational view of the selected parts of the shift position control mechanism of illustrated in FIGS. 50 and 51 with the positioning plate being in the top position.
Figure 53:
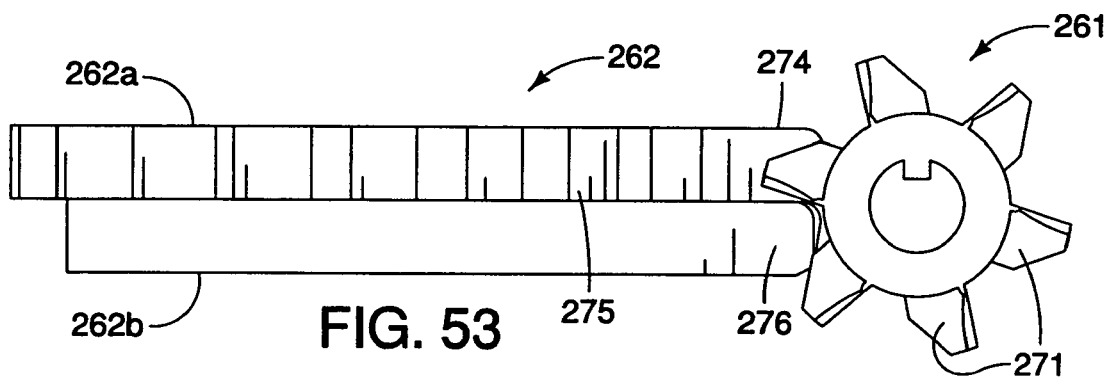
FIG. 53 is a second side elevational view of the selected parts of the shift position control mechanism of illustrated in FIGS. 50-52 with the positioning plate being in the top position.
Figure 54:
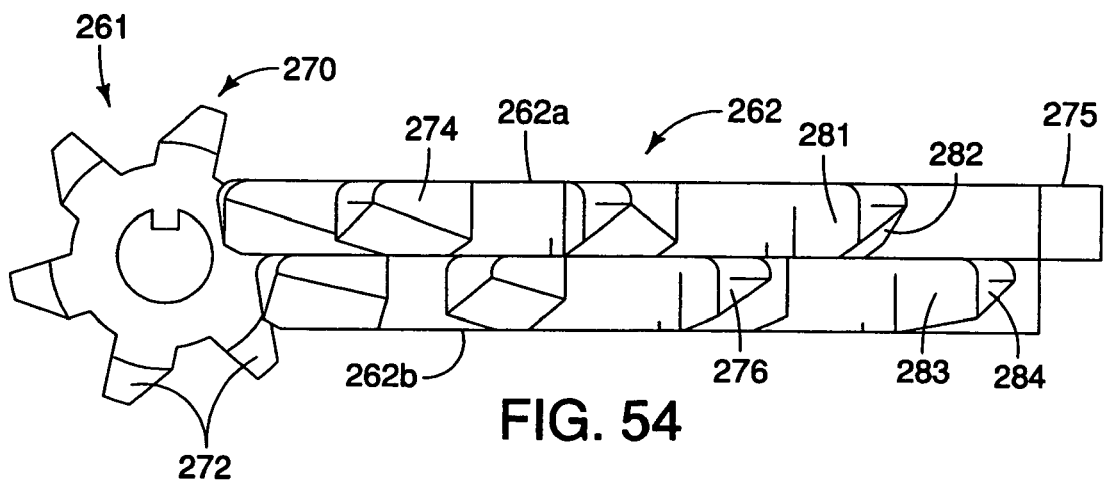
FIG. 54 is a third side elevational view of the selected parts of the shift position control mechanism of illustrated in FIGS. 50-53 with the positioning plate being in the top position.
Figure 55:
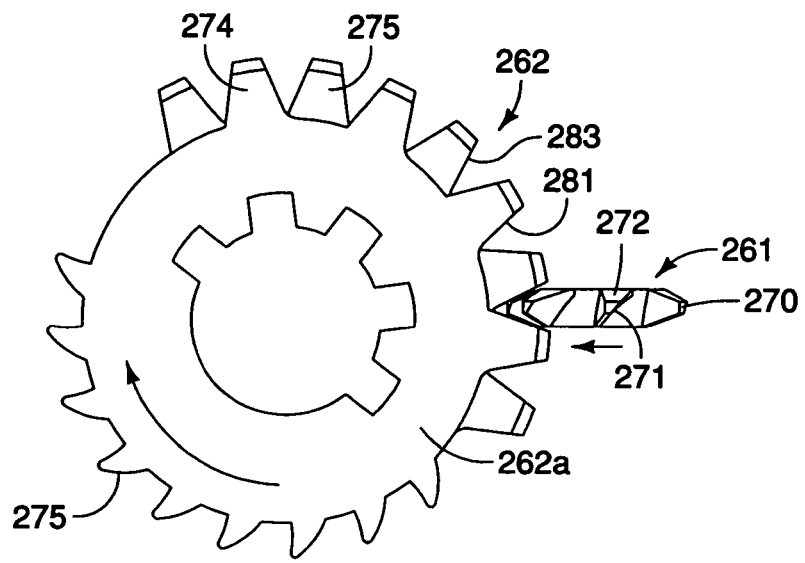
FIG. 55 is a first side elevational view of the selected parts of the shift position control mechanism of illustrated in FIGS. 50-54, but with the positioning plate being in the next lower gear position form FIGS. 50-54.
Figure 56:
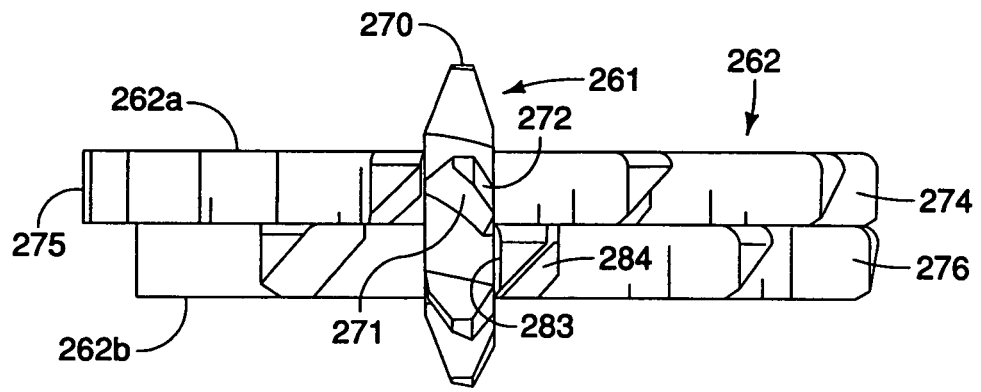
FIG. 56 is a second side elevational view of the selected parts of the shift position control mechanism of illustrated in FIG. 55, with the positioning plate being in the next lower gear position form FIGS. 50-54.
Figure 57:
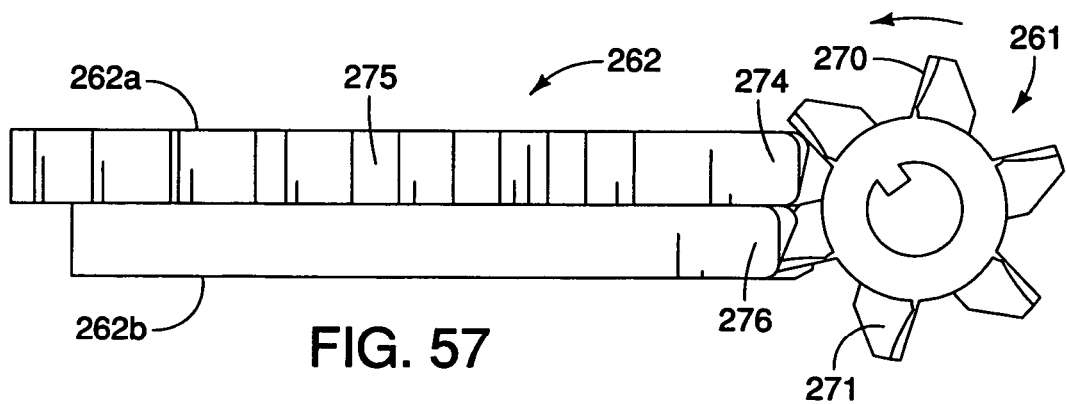
FIG. 57 is a third side elevational view of the selected parts of the shift position control mechanism of illustrated in FIGS. 55 and 56, with the positioning plate being in the next lower gear position form FIGS. 50-54.
Figure 58:
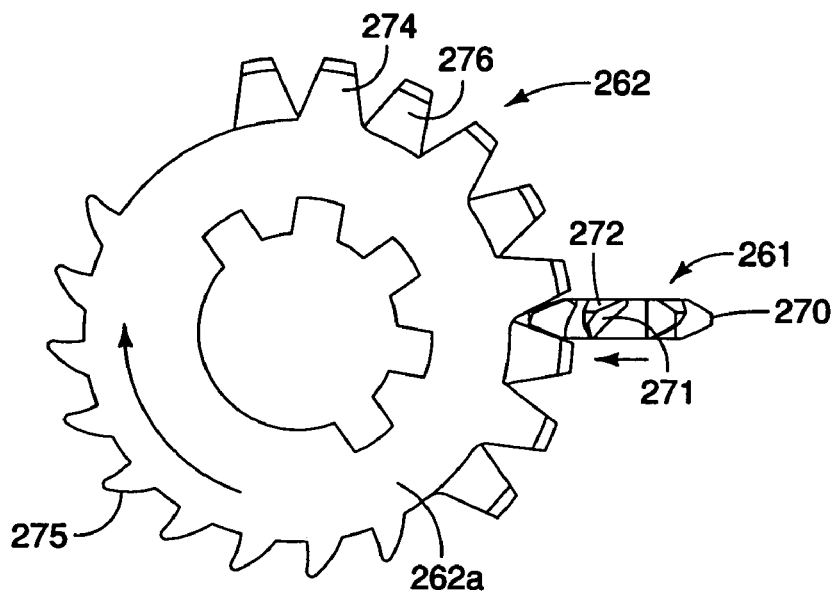
FIG. 58 is a first side elevational view of the selected parts of the shift position control mechanism of illustrated in FIGS. 50-54, but with the positioning plate being in the next lower gear position form FIGS. 55-57.
Figure 59:
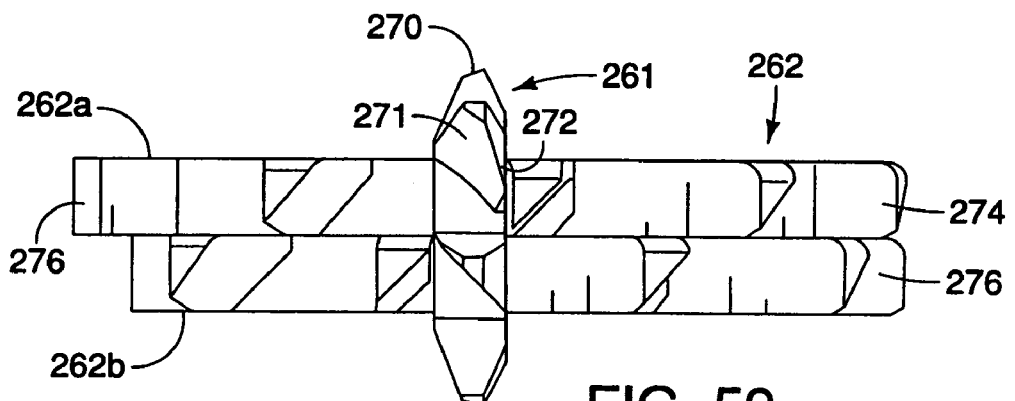
FIG. 59 is a second side elevational view of the selected parts of the shift position control mechanism of illustrated in FIG. 58, with the positioning plate being in the next lower gear position form FIGS. 55-57.
Figure 60:
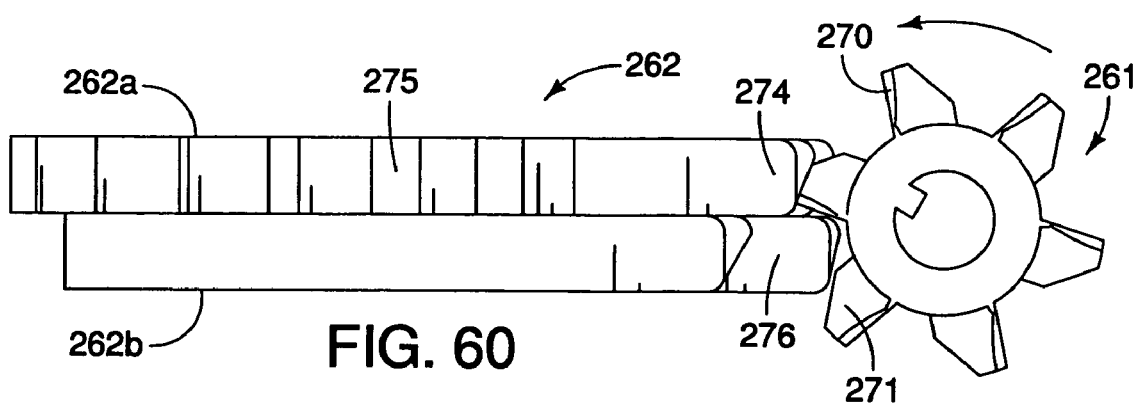
FIG. 60 is a third side elevational view of the selected parts of the shift position control mechanism of illustrated in FIGS. 58 and 59, with the positioning plate being in the next lower gear position form FIGS. 55-57.

As best seen FIGS. 48 and 49, the housing 240 of the shift unit 233 basically includes an upper casing 240a and a lower casing 240b that are coupled together by a fastener or a screw 244. The upper and lower casings 240a and 240b are preferably constructed of a light weight material such a hard rigid plastic material. The housing 240 is sized and configured to form an internal cavity for receiving the shift wire releasing assembly 241, the shift wire winding assembly 242 and the bicycle shift position control mechanism 243 therein. The upper casing 240a is provided with a upper keyed shaft or post 240c, while the lower casing 240b is provided with a lower keyed shaft or post 240d. The posts 240c and 240d are designed to prevent rotational movement of selected parts of the shift unit 233 as will become apparent from the description below.

As seen FIG. 48, the shift wire releasing mechanism 241 of the shifting unit 233 basically includes a shift release member 245 with a rack gear 246 and a shift release member return spring 247. The shift wire releasing assembly 241 is configured and arranged such that the rider can easily operate the shift release lever 245 to perform a shifting operation by pushing the shift release lever 245.

The shift release lever 245 preferably has an internal mounting portion 245a and an external rider operating portion 245b. The internal mounting portion 245a is configured and arranged to slide linearly in the lower casing 240b such that the shift release lever 245 can move between a rest position and a shift release position. The rack gear 246 is attached to inner end of the internal mounting portion 245a. The release member return spring 247 is disposed between the free end of the rack gear 246 and the lower casing 240b to bias the shift release lever 245 outwardly towards a rest position. A clip (not shown) is provided on the internal mounting portion 245a of the shift release lever 245 to prevent the shift release lever 245 from falling out of the lower casing 240b.

As seen FIG. 48, the shift wire winding mechanism 242 of the shift unit 233 basically includes a shift winding lever 250 with a winding pawl 251, a shift winding lever return spring 252 and a shift winding lever control plate 253. The shift wire winding assembly 242 is configured and arranged such that the rider can easily operate the shift winding lever 242 to perform a shifting operation.

The shift winding lever 250 basically includes an internal mounting portion 250a and an external rider operating portion 250b. The internal mounting portion 250a is configured and arranged to pivot around the outer periphery of the upper post 240c such that the shift winding lever 250 can move between a rest position and a shifting or winding position. The internal mounting portion 250a preferably includes a mounting tab 250c for pivotally supporting the winding pawl 251 and a stop flange 250d for maintaining the shift winding lever 250 in the rest position due to the biasing force of the winding lever return spring 252. Thus, movement of the shift winding lever 250 causes the winding pawl 251 to rotate therewith about the center axis of the upper post 240c.

The winding pawl 251 is mounted to the mounting tab 250c via a mounting pin 251a that is riveted onto the mounting tab 250c. The winding pawl 51 is held on the mounting pin 251a by a retaining clip 251b. Moreover, the winding pawl 251 is biased in a counterclockwise direction by a torsion spring 251c as seen in FIG. 48. The torsion spring 251c has a first end of the torsion spring 251c engaging the winding pawl 251 and a second end of the torsion spring 251c engaging the mounting tab 250c of the shift winding lever 250. As explained below, the winding pawl 251 is configured and arranged to selectively engage the bicycle shift position control mechanism 243 when the shift winding lever 250 is pivoted from its rest position to its shift release position.

The winding lever return spring 252 is preferably a torsion spring having a first end 252a engaging the shift winding lever 250 and a second end 252b engaging the shift winding lever control plate 253. The winding lever return spring 252 biases the shift winding lever 250 in a clockwise direction as seen in FIG. 48. Accordingly, the shift winding lever 250 and the winding lever return spring 252 cooperate together such that the shift winding lever 250 as a trigger action in which the shift winding lever 250 automatically springs back to its rest position after being moved to a shift release position. Preferably, the first end 252a of the winding lever return spring 252 is hooked on to the mounting tab 250c to bias the shift winding lever 250 in the clockwise direction.

The shift winding lever control plate 253 is preferably a flat plate with a center opening 253a that is keyed such that it engages the upper post 240c to prevent rotational movement therebetween. The shift winding lever control plate 253 also has a hole 253b for receiving the second end 252b of the winding lever return spring 252 therein. A stop member or flange 253c is formed on the outer periphery of the shift winding lever control plate 253 to act as a stop for the shift winding lever 250. In particular, the stop flange 250d of the shift winding lever 250 is normally biased against the stop member 253c.

As seen FIGS. 48 and 49, the bicycle shift control mechanism 243 of the shift unit 233 basically includes a pawl cam plate 259, an input transfer mechanism 260, a releasing member or wheel 261, a positioning member or wheel 262, a wire take up member 263, a spacer 265, a wire take up release spring or biasing member 266 and a mounting plate 267.

The pawl cam plate 259 is a flat rigid metal plate that is fixed to the housing 240 so that it does not rotate or move. In particular, the pawl cam plate 259 has a center opening 259a that is keyed so as to mate with the post 240d of the lower casing 240b. Of course, other non-circular cross sections can be utilized to prevent relative rotation between the pawl cam plate 259 and the housing 240. The pawl cam plate 259 preferably includes a winding pawl holding projection 259b. The pawl holding projection 259b is preferably formed peripheral edge of the pawl cam plate 259. The winding pawl holding projection 259b is configured and arranged to hold the winding pawl 251 in a disengaged or rest position against the biasing force of the spring 251c.

The input transfer mechanism 260 basically includes a mounting shaft 260a, an input gear 260b, an output gear 260c, and a compression spring 260d. The input gear 260b is mounted on one end of the mounting shaft 260a so as to be freely rotatable relative to the mounting shaft 260a. The output gear 260c, on the other hand, is fixed to the mounting shaft 260a so as to rotate the mounting shaft 260a. The abutting faces of the input gear 260b, the output gear 260c have ramp shaped detents and ramp shaped recesses, respectively, such that the input gear 260b and the output gear 260c rotate together when the shift release member 245 is push into the housing 240 from the rest position to the shift release position and such that the input gear 260b rotates independently of the output gear 260c when the shift release member 245 returned from the shift release position back to the rest position. Thus, the input gear 260b, the output gear 260c, and the compression spring 260d are configured and arranged to from a one-way clutch so that the mounting shaft 260a only rotates in one direction by the movement of the shift release member 245. In particular, when the shift release member 245 is push into the housing 240 from the rest position to the shift release position, the rack gear 246 engages the input gear 260b, which rotates the output gear 260c and the mounting shaft 260a. When the shift release member 245 is released, the rack gear 246 rotates the input gear 260b, but does not rotate the output gear 260c and the mounting shaft 260a do not rotate because the compression spring 260d allows the input gear 260b to move axially out of engagement with the output gear 260c. When the shift release member 245 is in the normal rest position, the teeth of the input gear 260b are not engaged with the rack gear 246 so that the mounting shaft 260a can freely rotate in either direction do to the movement of the shift winding lever 250.

The releasing member or wheel 261 is preferably formed as gear that is fixedly mounted on the mounting shaft 260a. The releasing wheel 261 is configured and arranged to selectively move or be moved by the positioning member or wheel 262 as will become apparent from the following discussion. The releasing member or wheel 261 constitutes a rotatable position maintaining wheel in this embodiment that is arranged to rotate about a rotational axis that is substantially perpendicular to the rotational axis of the wire take up member 263.

The release wheel 261 is rotated in one rotational direction by the shift release lever 245 and a second rotational direction by the shift winding lever 250. Preferably, the shift release lever 245, the shift winding lever 250, the releasing wheel 261 and the positioning wheel 262 are configured and arranged such that multiple shifting operations are possible with a single progressive movement of the shift release lever 245 or the shift winding lever 250.

The releasing wheel 261 includes a plurality of detent teeth 270 which selectively engage the positioning wheel 262 for rotating the releasing positioning wheel 262 or to be rotated by the positioning wheel 262. The detent teeth 270 form a plurality of first position maintaining members and a plurality of second position maintaining members disposed between the first position maintaining members. In other words, releasing wheel 261 form a rotatable position maintaining wheel with the detent teeth 270 being position maintaining members that selectively engage the positioning member or wheel 262.

The detent teeth 270 are each provided with an angled cam surface 271 and an abutment surface 272. The angled cam surfaces 271 are angled approximately forty-five degrees to a plane containing the axis of rotation of the mounting shaft 260a and that is perpendicular to axis of rotation of the positioning wheel 262. The angled cam surfaces 271 of the detent teeth 270 are configured and arranged to cause the releasing wheel 261 in response to rotation of the positioning wheel 262 in the wire winding direction (counterclockwise direction in FIGS. 51, 55 and 58). On the other hand, the abutment surfaces 272 contact the positioning wheel 262 to prevent rotation of the positioning wheel 262 due to the force of the wire take up release spring 266. In particular, the contact force between the releasing wheel 261 and the positioning wheel 262 is directed perpendicular to the axis of rotation of the releasing wheel 261 so that the releasing wheel 261 does not rotate due to the urging force of the wire take up release spring 266 on the positioning wheel 262.

The positioning member or wheel 262 is preferably formed of a pair of flat metal positioning plates 262a and 262b that are mounted on the post 240d to rotate around the post 240d. The positioning plates 262a and 262b are fixed to the wire take up member 263 such that they rotate together in response to movement of either the shift release lever 245 or the shift winding lever 250. More specifically, the positioning wheel 262 is biased in a clockwise direction by the wire take up release spring 266, but normally held in one of the gear shift positions by one of the detent teeth 270 that form the first and second position maintaining members.

The positioning plates 262a and 262b preferably includes non-circular openings that is configured and arranged to mate with projections of the wire take up member 263 to prevent relative rotation therebetween. Preferably, the peripheral surface of the positioning plate 262a is provided with a plurality of positioning teeth 274 and a plurality of shift winding teeth 275. Preferably, the peripheral surface of the positioning plate 262b is also provided with a plurality of positioning teeth 276.

The shift positioning teeth 274 and 276 are configured and arranged to selectively engage the detent teeth 270 such that the wire take up member 263 can be selectively held in one of the gear shift positions. Thus, the positioning member or wheel 262 includes a set of first positioning teeth 274 lying in a first plane and a set of second positioning teeth 276 lying in a second plane that is offset and parallel to the first plane. In other words, the shift positioning teeth 274 and 276 move in planes that are perpendicular to the rotational plane of the detent teeth 270 of the releasing wheel 261. The shift winding teeth 275 are configured and arranged to be selectively engaged by the tooth of the winding pawls 251 of the shift winding lever 250. In particular, the detent teeth 270 (first and second position maintaining members) are configured and arranged to alternately engage the first and second teeth of the shift positioning teeth 274 and 276 as the detent teeth 270 (first and second position maintaining members) are moved to perform a shifting operation between sequential shift positions of the predetermined shift positions.

The first shift positioning teeth 274 include an abutment surface 281 and a cam surface 282. Likewise, the second shift positioning teeth 276 include an abutment surface 283 and a cam surface 284. The angled cam surfaces 282 and 284 are angled approximately forty-five degrees to a plane that contains the axis of rotation of the mounting shaft 260a and that is perpendicular to axis of rotation of the positioning wheel 262. The abutment surfaces 281 and 283 of each of the shift positioning teeth 274 and 276 are arranged to selectively engage one of the detent teeth 270 such that the positioning wheel 262 is maintained in one of the predetermined shift positions. The angled cam surfaces 282 and 284 of the positioning wheel 262 selectively engage the angled cam surfaces 271 of the detent teeth 270 to cause the releasing wheel 261 in response to rotation of the positioning wheel 262 in the wire winding direction (counterclockwise direction in FIGS. 51, 55 and 58) by the movement of the shift winding lever 250. On the other hand, the abutment surfaces 281 and 283 of the positioning wheel 262 selectively engage the abutment surfaces 272 of the release wheel 261 to prevent rotation of the positioning wheel 262 due to the force of the wire take up release spring 266.

Thus, the cam surfaces 282 and 284 of each of the shift positioning teeth 274 and 276 are arranged to selectively cooperate with one of the detent teeth 270 such that rotation of the positioning wheel 262 causes rotation of the releasing wheel 261 (rotatable position maintaining wheel) to index the positioning wheel 262 between the sequential shift positions of the predetermined shift positions. During downshifting, the detent teeth 270 are selectively moved out of engagement with one of the positioning teeth 274 and 276 so that the positioning wheel 262 rotates in a clockwise direction due to the force of the wire take up release spring 266. During upshifting, one of the angled cam surfaces 282 and 284 of one of the shift positioning teeth 274 and 276 contacts one of the angled cam surfaces 271 of the detent teeth 270 with one of the detent teeth 270 to rotate the release wheel 261 such that the next one of shift positioning teeth 274 and 276 contacts the next one of the detent teeth 270 of the release wheel 261. Thus, the release wheel 261 is rotated in one rotational direction by the shift release lever 245 and a second rotational direction by the shift winding lever 250. Preferably, the shift release lever 245, the shift winding lever 250, the releasing wheel 261 and the positioning wheel 262 are configured and arranged such that multiple shifting operations are possible with a single progressive movement of the shift release lever 245 or the shift winding lever 250.

The wire take up member 263 is a conventional type wire take up spool in which the inner wire 18a is round along the peripheral edge surface of the wire take up member 263 as the wire take up member 263 is rotated in a counterclockwise direction. Thus, the wire take up member 263 has a center opening 263a that is rotatably mounted on the post 240d. The peripheral edge of the wire take up member 263 has a wire attachment opening 263b for attaching the inner wire 18a of the shift cable 18 thereto. Also, the peripheral edge of the wire take up member 263 has a hook member 263c for attaching the wire take up release spring 266 thereto. Thus, the wire take up release spring 266 biases the wire take up member 263 in a clockwise direction, i.e., a shift release direction. The upper surface of the wire take up member 263 has a plurality of projections 263d which engage a plurality of recesses formed in the opening of the positioning wheel 262. Thus, the positioning wheel 262 and the wire take up member 263 are coupled together so as that they rotate together as a unit when the shifting unit 233 is in the assembled state.

The wire take up release spring 266 is preferably a torsion spring having a first end 266a attached to the hook 263c of the wire take up member 263, and a second end 266b coupled to the mounting plate 267. The wire take up release spring 266 applies a biasing force to urge the wire take up member 263 in the clockwise direction.

The spacer 265 is a hat shaped member having a flat base plate 265a and a tubular member 265b. The base member 265a is configured and arranged so as to prevent the wire take up release spring 266 from being compressed when the shift unit 233 is assembled. The tubular portion 265b is non-rotatably secured to the lower post 240d and maintains proper spacing for the wire take up member 263 and the wire take up release spring 266.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift position control mechanism comprising:
    a wire take up member configured and arranged to rotate about a rotational axis;

a positioning member configured and arranged to rotate with the wire take up member between at least three distinct predetermined shift positions;

a first position maintaining member being selectively movable between a first engagement position and a first disengagement position in which the first position maintaining member engages the positioning member to hold the positioning member in at least one of the at least three distinct predetermined-shift positions when the first position maintaining member is in the first engagement position, and in which the first position maintaining member disengages the positioning member to release the positioning member for rotational movement when the first position maintaining member is moved from the first engagement position to the first disengagement position, with the first position maintaining member and the positioning member being in non-contacting positions with respect to each other when in the first disengagement position; and a second position maintaining member being selectively movable between a second engagement position and a second disengagement position in which the second position maintaining member engages the positioning member to hold the positioning member in at least one of the at least three distinct predetermined shift positions when the second position maintaining member is in the second engagement position, and in which the second position maintaining member disengages the positioning member to release the positioning member for rotational movement when the second position maintaining member is moved from the second engagement position to the second disengagement position, with the second position maintaining member and the positioning member being in non-contacting positions with respect to each other when in the second disengagement position, the first and second position maintaining members alternately engaging the positioning member during three sequential shifting operations corresponding to the at least three distinct predetermined shift positions to alternately maintain the positioning member in the at least three distinct predetermined shift positions such that one of the first and second position maintaining members is contacting the positioning member and the other of the first and second position maintaining members is not contacting the positioning member when the first and second position maintaining members are at rest positions.

2. The bicycle shift position control mechanism according to claim 1, wherein
the first and second position maintaining members include pivotally mounted pawls that selectively engage teeth of the positioning member.

3. The bicycle shift position control mechanism according to claim 2, further comprising
a releasing member configured and arranged to selectively move the first position maintaining member between the first engagement position and the first disengagement position, and to selectively move the second position maintaining member between the second engagement position and the second disengagement position.

4. The bicycle shift position control mechanism according to claim 3, wherein
the releasing member is configured and arranged to rotate about the rotational axis of the wire take up member.

5. The bicycle shift position control mechanism according to claim 1, further comprising a biasing member operatively coupled to the positioning member to apply an urging force on the positioning member in a first rotational direction with the first and second position maintaining members selectively engaging the positioning member to prevent rotation in the first rotational direction against the urging force of the biasing member.

6. The bicycle shift position control mechanism according to claim 5, wherein
the first and second position maintaining members include pivotally mounted pawls that selectively engage teeth of the positioning member.

7. The bicycle shift position control mechanism according to claim 5, further comprising
a releasing member configured and arranged to selectively move the first position maintaining member between the first engagement position and the first disengagement position, and to selectively move the second position maintaining member between the second engagement position and the second disengagement position.

8. The bicycle shift position control mechanism according to claim 7, wherein
the releasing member is configured and arranged to rotate about the rotational axis of the wire take up member.

9. The bicycle shift position control mechanism according to claim 7, wherein
the releasing member is configured and arranged to selectively release the positioning member from the first and second position maintaining members to cause the positioning member to rotate one shift position of the at least three distinct predetermined shift positions when the releasing member is moved a first predetermined amount and to cause the positioning member to rotate two consecutive shift positions of the at least three distinct predetermined shift positions when the releasing member is moved a second predetermined amount in a single shift operation.

10. The bicycle shift position control mechanism according to claim 1, wherein
the first and second position maintaining members are formed as part of a rotatable position maintaining wheel having a plurality of detent teeth that selectively engage teeth of the positioning member.

11. The bicycle shift position control mechanism according to claim 10, wherein
the positioning member includes a set of first teeth lying in a first plane and a set of second teeth lying in a second plane that is offset and parallel to the first plane, and
the first and second position maintaining members are configured and arranged to alternately engage the first and second teeth of the positioning member as the first and second position maintaining members are moved to perform a shifting operation between sequential shift positions of the at least three distinct predetermined shift positions.

12. The bicycle shift position control mechanism according to claim 11, wherein
the first and second teeth include an abutment surface and a cam surface, with the abutment surface of each of the first and second teeth being arranged to selectively engage one of the detent teeth such that the positioning member is maintained in one of the at least three distinct predetermined shift positions, and the cam surface of each of the first and second teeth being arranged to selectively cooperate with one of the detent teeth such that rotation of the positioning member causes rotation of the rotatable position maintaining wheel to index the positioning member between the sequential shift positions of the at least three distinct predetermined shift positions.

13. The bicycle shift position control mechanism according to claim 10, wherein
the rotatable position maintaining wheel is arranged to rotate about a rotational axis that is substantially perpendicular to the rotational axis of the wire take up member.

14. The bicycle shift position control mechanism according to claim 12, further comprising
a biasing member operatively coupled to the positioning member to apply an urging force on the positioning member in a first rotational direction with the first and second position maintaining members selectively engaging the positioning member to prevent rotation in the first rotational direction against the urging force of the biasing member.

15. The bicycle shift position control mechanism according to claim 10, further comprising
a biasing member operatively coupled to the positioning member to apply an urging force on the positioning member in a first rotational direction with the first and second position maintaining members selectively engaging the positioning member to prevent rotation in the first rotational direction against the urging force of the biasing member.

16. The bicycle shift position control mechanism according to claim 15, wherein
the rotatable position maintaining wheel is arranged to rotate about a rotational axis that is substantially perpendicular to the rotational axis of the wire take up member.

17. A bicycle shift position control mechanism comprising:
a wire take up member configured and arranged to rotate about a rotational axis in a wire winding direction and a wire releasing direction;
a positioning member arranged to rotate with the wire take up member between one of a plurality of predetermined shift positions;
a first position maintaining member including a pivotally mounted pawi being selectively movable between a first engagement position that selectively engage teeth of the positioning member in one of the predetermined shift positions and a first disengagement position that releases the positioning member for rotational movement;
a second position maintaining member including a pivotally mounted pawl being selectively movable between a second engagement position that holds the positioning member in one of the predetermined shift positions and a second disengagement position that releases the positioning member for rotational movement; and
a releasing member arranged to rotate in the wire releasing direction to selectively move the first position maintaining member between the first engagement position and the first disengagement position, and to selectively move the second position maintaining member between the second engagement position and the second disengagement position,
the releasing member being arranged to selectively release the positioning member from the first and second position maintaining members to cause the positioning member to rotate one shift position of the predetermined shift positions when the releasing member is moved a first predetermined amount and to cause the positioning member to rotate two consecutive shift positions of the predetermined shift positions when the releasing member is moved a second predetermined amount in a single shift operation.

* * * * *